US007441262B2

(12) United States Patent
Hui et al.

(10) Patent No.: US 7,441,262 B2
(45) Date of Patent: Oct. 21, 2008

(54) INTEGRATED VPN/FIREWALL SYSTEM

(75) Inventors: Man Him Hui, Kanata (CA); David Philip Lapp, Ottawa (CA)

(73) Assignee: Seaway Networks Inc.

( * ) Notice: Subject to any disclaimer, the term of this patent is extended or adjusted under 35 U.S.C. 154(b) by 729 days.

(21) Appl. No.: 10/192,802

(22) Filed: Jul. 11, 2002

(65) Prior Publication Data

US 2004/0010712 A1 Jan. 15, 2004

(51) Int. Cl.
*H04L 9/00* (2006.01)
(52) U.S. Cl. .............................. 726/1; 726/11; 726/12; 726/13; 726/14; 713/154; 713/169; 709/229
(58) Field of Classification Search ............. 726/13–23, 726/11, 12, 1; 709/250, 229; 713/169, 154; 370/229, 392
See application file for complete search history.

(56) References Cited

U.S. PATENT DOCUMENTS

| | | | | |
|---|---|---|---|---|
| 6,219,786 | B1 * | 4/2001 | Cunningham et al. | 713/152 |
| 6,636,898 | B1 * | 10/2003 | Ludovici et al. | 709/250 |
| 6,754,832 | B1 * | 6/2004 | Godwin et al. | 726/14 |
| 6,781,990 | B1 * | 8/2004 | Puri et al. | 370/392 |
| 6,928,553 | B2 * | 8/2005 | Xiong et al. | 726/22 |
| 6,957,274 | B2 * | 10/2005 | Trace et al. | 709/242 |
| 7,028,332 | B1 * | 4/2006 | Jason, Jr. | 726/1 |
| 2002/0191604 | A1 * | 12/2002 | Mitchell et al. | 370/389 |
| 2003/0110274 | A1 * | 6/2003 | Pazi et al. | 709/229 |
| 2003/0145227 | A1 * | 7/2003 | Boden | 713/201 |
| 2003/0154399 | A1 * | 8/2003 | Zuk et al. | 713/201 |
| 2003/0172264 | A1 * | 9/2003 | Dillon | 713/160 |
| 2004/0117653 | A1 * | 6/2004 | Shapira et al. | 713/201 |

OTHER PUBLICATIONS

William Stallings et al., "IP Security", Mar. 2000, pp. 11-26, Internet Protocol Journal, vol. 3, No. 1.*
Kent & Atkinson, Standards Track "Security Architecture for the Internet Protocol" Network Working Group, The Internet Society, Nov. 1998, pp. 1-66.
NetScreen, "High Performance Firewall, VPN, and traffic shaping" http://www.netscreen.com/main.html.
NetScreen "Products" http://www.netscreen.com/products/datasheets.html.
NetScreen "Solutions" http://www.netscreen.com/solutions/index.html.
RapidStream, Inc.—Offering High Performance, ASIC based, VPN, Firewall http://www.rapidstream.com/.

* cited by examiner

*Primary Examiner*—Nasser Moazzami
*Assistant Examiner*—Shanto M Abedin
(74) *Attorney, Agent, or Firm*—Cassan Maclean

(57) ABSTRACT

Systems, devices, and methods relating to network firewalls and VPN gateways for controlling and securing access to networks. An integrated VPN/firewall system comprises at least one policy engine module, a switch module, a cryptographic engine module, and at least one flow engine module. Each flow engine module receives DTUs from either side of the integrated VPN/firewall system. The DTUs are then compared to entries in a listening table and entries in a flow table. The entries in these tables consist of characteristics of DTUs expected to arrive for specific flows. Entries to both listening tables and flow tables are made by the policy engine with listening table entries generally denoting flows potentially allowed by policy to be established between computers on opposite sides of the system. Flow tables, on the other hand, correspond to flows already allowed to be established between computers on opposite sides of the firewall system.

25 Claims, 13 Drawing Sheets

INTEGRATED VPN/FIREWALL SYSTEM

FIELD OF THE INVENTION

The present invention relates to the field of computer networks and is especially, but not exclusively, applicable to methods and apparatus for controlling access to a computer network by unauthorized data transmission units (DTUs)

BACKGROUND TO THE INVENTION

The increasing proliferation of both large and small computer networks in not only workplaces but also in private homes has highlighted the need for increased network security. Companies and individuals increasingly rely on their networks for not only continued productivity but, in some cases, for direct profits. This increasing reliance on computer networks and the boom in both activity and reliance on the largest network of all, the Internet, emphasizes the vulnerability of computer networks to malicious attacks from hackers. Some of these attacks are commonly launched through the Internet—one of the more vulnerable points of a network typically being its Internet connection.

To prevent these attacks or to blunt their effectiveness, networks and even sole computers use firewalls—hardware, software or a combination of both that checks any incoming traffic to determine if the traffic is legitimate or is part of a hacker's assault on the network/computer being protected.

Currently, there are two predominant types of firewalls in common use—application proxies and packet filters. Application proxies act in place of the servers/computers to be protected when establishing/receiving connections with external computers. The application proxy acts as a go-between the server/computer being protected and any external traffic—any connection to the external world is established between the application proxy and the external computer and not directly between the external computer and the server/computer being protected. Thus, any malicious attacks theoretically occur against the application proxy and not against the critical server/computer.

The other type of firewall currently in use is the packet filter. The packet filter firewall "filters" or checks all packets being received from the world external to the network being protected. The packet filter typically checks the header of these packets and, if any packets have suspicious headers, the packet is dropped and the user or system administrator is notified. Security polices set by the user or system administrator determine the amount of security provided by the firewall These policies are set when the firewall is configured by the administrator and can be manually adjusted as required. The user or system administrator can loosen or tighten the security provided by a firewall by controlling from which source computers traffic will be accepted. On one end of the spectrum, the firewall can be configured to accept traffic/packets only from a select few sources/servers and any other traffic is to be discarded. On the other end of the spectrum, the firewall can be configured to accept all traffic. Typically, a happy medium between these two ends is desirable.

While the above described how types of firewalls work to protect today's servers and networks, they each have their disadvantages. It is commonly accepted that while application proxies are much more secure than packet filters, they are much slower than packet filters. Conversely, packet filters, while fast, do not provide as much security.

It should be noted that some firewalls provide both packet filtering functions along with application proxy functions. Such hybrid firewalls can provide either the security or the speed required by most applications. It should further be noted that the security policies enforced for a specific firewall, and hence the decisions which determine whether specific packets are to be accepted or discarded, is usually dependent on the application being shielded by the firewall. As such, e-mail applications and Internet browsers may have different applicable security policies. An e-mail application may have tighter applicable filtering security policies than an Internet browser due to the greater risk of viruses and worms being spread by way of e-mail messages. Conversely, a TELNET application may have stricter login security policies than an e-mail authentication/login application due to the greater risk of hackers trying to compromise the system by way of the TELNET application. One major issue with providing suitably secure connections across a firewall is the balancing act between the seemingly contrary concerns of speed and security. It has been widely accepted that the greater the security a firewall provides, the slower the connection. Conversely, the faster the connection, it is usual that the firewall security is not as strong. A solution to the firewall speed/security issue would provide as much security as required by the network while still providing acceptable transmission and reception rates.

Another cause for concern in today's networking regime is the proliferation of VPNs—virtual private networks. VPNs allow enterprises to have a single network spanning across multiple, geographically remote offices. In essence, a network in New York can be connected to a network in Houston with either network being able to seamlessly access files on the other network. These VPNs are connected across the Internet and, unfortunately, the secure nature of the VPNs require extra security processing at each end of the VPN link. Such extra processing tends to slow down those VPN links.

From the above, there is therefore a need for solutions to both the problems of speed and security for firewalls and speed for VPNs. It would be most advantageous if such a solution provided both firewall and VPN functionality in one device.

It is an object of the present invention to overcome or at least mitigate the shortcomings of the prior art or provide an alterative to prior solutions.

It should be noted that the term data transmission unit (DTU) will be used in a generic sense throughout this document to mean units through which digital data is transmitted from one point in a network to another. Thus, such units may take the form of packets, cells, frames, or any other unit as long as digital data is encapsulated within the unit. Thus, the term DTU is applicable to any and all packets, cells, frames, or any other units that implement specific protocols, standards or transmission schemes. It should also be noted that the term digital data will be used throughout this document to encompass all manner of voice, multimedia content, video, binary data or any other form of data or information that has been digitized and that is transmitted from one point in a network to another.

SUMMARY OF THE INVENTION

The present invention provides systems, devices, and methods relating to network firewalls and VPN gateways for controlling and securing access to networks. An integrated VPN/firewall system comprises at least one policy engine module, a switch module, a cryptographic engine module, and at least one flow engine module. Each flow engine module receives DTUs from either side of the integrated VPN/firewall system. The DTUs are then compared to entries in a listening table and entries in a flow table. The entries in these tables consist of characteristics of DTUs expected to arrive for specific flows. If a DTU matches an entry, the DTU may be forwarded by the ingress flow engine to the egress flow engine via the switch module, and subsequently to its destination by the egress flow engine; or it may be forwarded, using the switch module, to the policy engine module for further security checking, or to the cryptographic engine module for encryption/decryption required for VPN operations. Entries to both listening tables and flow tables are made by the policy engine with listening table entries generally denoting flows potentially allowed by policy to be established between computers on opposite sides of the system. Flow tables, on the other hand, correspond to flows already allowed to be established between computers on opposite sides of the firewall system.

In a first aspect the present invention provides a method of verifying data transmission units (DTUS) being received by a device, the method comprising the steps of:
 a) receiving an incoming DTU;
 b) determining if said incoming DTU has characteristics which match at least one set of criteria;
 c) in the event said characteristics of said incoming DTU match said at least one set of criteria, forwarding said incoming DTU to a separate component of the device for further processing;
 d) in the event said characteristics of said incoming DTU does not match said at least one set of criteria, forwarding said incoming DTU to a policy engine module for further checking wherein said method is executed by a system comprising:
  the policy engine module for enforcing security policies for said network and for inserting and deleting entries in at least one flow table and in at least one listening table;
  at least one flow engine module for receiving data transmission units (DTUs) from sources external to said system and for forwarding said DTUs to destinations external to said system; and
  a switch module for routing DTUs between different modules in said system wherein
  said switch module is coupled to each one of the other modules in the system;
  said flow engine module receives and forwards DTUs if said DTUs match an entry in either said flow table or said listening table.

In a second aspect the present invention provides a system for providing firewall and virtual private networking functions to a network, the system comprising:
 a policy engine module for enforcing security policies for said network and for inserting entries in at least one flow table and in at least one listening table;
 at least one flow engine module for receiving data transmission units (DTUs) from sources external to said system and for forwarding said DTUs to destinations external to said system;
 a switch module for routing DTUs between different modules in said system wherein
 said switch module is coupled to each one of the other modules in the system;
 said flow engine module receives and forwards DTUs if said DTUs match an entry in either said flow table or said listening table.

In a third aspect the present invention provides a method of verifying data transmission units (DTUs) being received by a device, the method:
 a) receiving an incoming DTU at a flow engine module;
 b) checking at least one table for a match between characteristics of expected DTUs and characteristics of said incoming DTU, said at least one table containing entries listing characteristics of expected DTUs;
 c) in the event that a match is found, forwarding said incoming DTU to a module chosen from a group comprising:
  another flow engine module for forwarding said incoming DTU to a destination;
  a cryptographic engine module for decrypting or encrypting said incoming DTU; and
  a policy engine module for checking said incoming DTU
 d) in the event a match is not found, forwarding said incoming DTU to the policy engine module for checking said incoming DTUs against predetermined criteria.

In a fourth aspect the present invention provides a device for interconnecting at least two networks, the device comprising:
 at least one policy engine module for enforcing security policies of a first network against data traffic coming from and going to at least one second network, said at least one policy engine module inserts and deletes entries in at least one flow table and at least one listening table;
 at least one flow engine module for receiving said data traffic from said at least one second network and for transmitting said data traffic to said at least one second network; and
 a switch module for forwarding relevant data traffic between modules internal to said device;

wherein said switch module is coupled to each one of the other modules in the device and the or each of said flow engine modules receives and forwards said data traffic if said data traffic matches entries in said at least one flow table or in said at least one listening table.

BRIEF DESCRIPTION OF THE DIAGRAMS

A better understanding of the invention will be obtained by considering the detailed description below, with reference to the following drawings in which.

DETAILED DESCRIPTION

Figure 1:
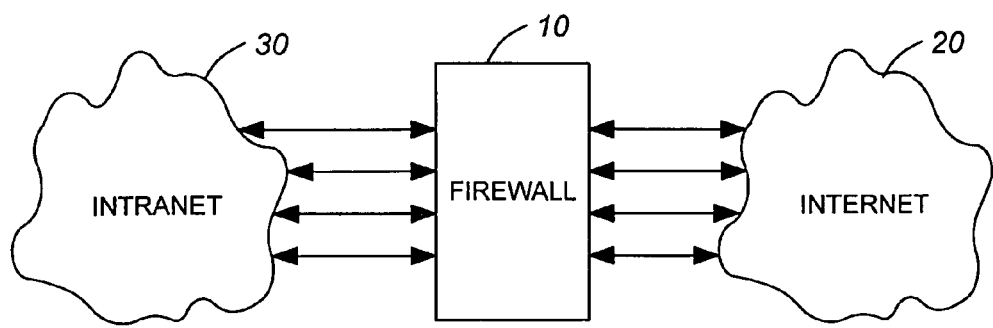
FIG. 1 is a schematic diagram illustrating the function of a firewall system.

Referring to FIG. 1, a schematic diagram of the function of a firewall 10 is presented. The firewall 10 is positioned between the Internet 20 and an intranet 30. The intranet 30 is presented as a network with multiple computers and servers in the Figure but it may also be a single computer. The firewall 10 receives and send DTUs to and from the intranet 30 and to and from the Internet 20. Any data traffic between the Internet 20 and the intranet 30 must pass through the firewall 10 so that the firewall 10 may check that traffic. For some applications, an extra network(s), termed a DMZ or demilitarized zone, is provided on the firewall. The DMZ typically houses servers providing services accessible to Internet traffic, such as web servers, FTP servers, email servers, and DNS (domain name servers) servers.

Figure 2:
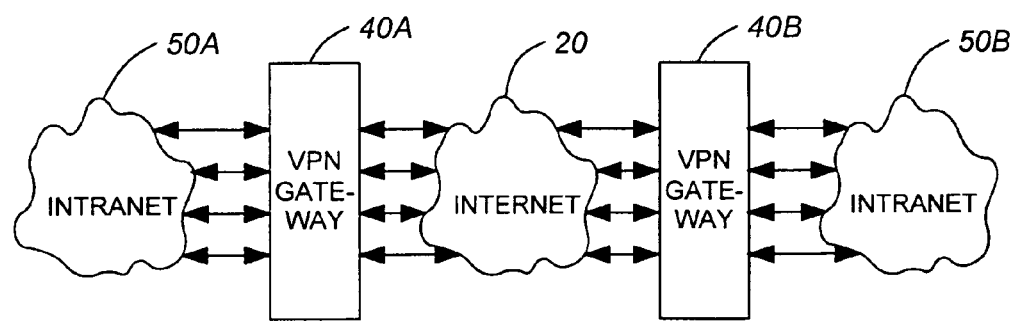
FIG. 2 is a schematic diagram illustrating the function of a VPN gateway.

For a VPN system, FIG. 2 schematically illustrates the function of a VPN gateway 40. Two intranets 50A, 50B are at opposite ends of the Internet 20. Two VPN gateways 40A, 40B manage any data traffic being sent by or received by the intranets 50A, 50B. The VPN gateways 40A, 40B authenticate, encrypt (if necessary), and route any DTUs to and from the intranets 50A, 50B. Any data traffic between the intranets 50A, 50B is exchanged through the VPN gateways 40A, 40B across the Internet 20.

Figure 3:
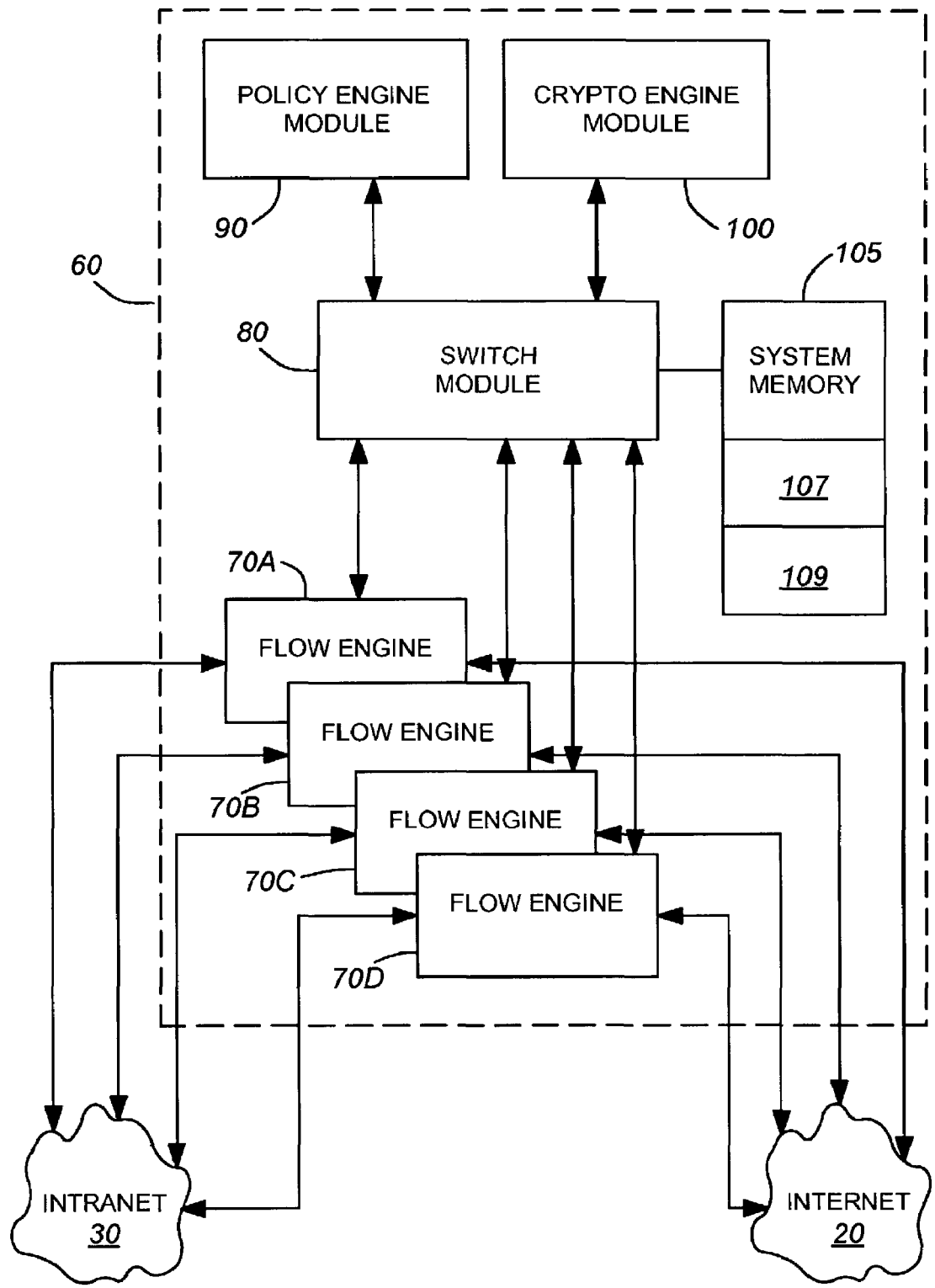
FIG. 3 is a block diagram of system according to one aspect of the invention.

To provide both firewall and VPN functions, a system 60 is provided in FIG. 3. The system 60 comprises one or multiple flow engine modules 70A, 70B, 70C, 70D, a switch module 80, a policy engine module 90, and a cryptographic engine module 100 and a system memory module 105. Each of the flow engine modules 70A, 70B, 70C, 70D are coupled to the switch module 80. The switch module 80 is coupled to both the policy engine module 90 and the cryptographic engine module 100. Each of the flow engine modules 70A, 70B, 70C, 70D can receive and transmit DTUs to and from either the intranet 30 or the Internet 20. The system memory module 105 is shared by all the other modules as required.

In terms of functions, the flow modules receive and forward any DTUs from and to any destination external to the system 60. The flow engine module also determines if any received DTUs are to be forwarded to another flow engine module or to another module internal to the system 60. The switch module forwards any DTU between any of the different modules internal to the system 60. The cryptographic engine module 100 provides any cryptographic functions, such as encrypting or decrypting any DTUs, that the system may need. The policy engine module provides the checking function—it checks any unknown/unexpected DTUs for compliance with the system's access or security policies. Such checking may take the form of content filtering, virus scanning, validation of new data flows according to pre-configured security policies, authentication of DTUs and of flows of DTUs, authorization of DTUs and flows of DTUs, and Internet Key Exchange if IPSec treatment is required. The policy engine module also makes entries in the main tables (flow tables 107 and listening tables 109) which determine which DTUs are to be allowed access or not. These two tables, stored in the system memory 105, are used by the flow engine modules to determine if a specific DTU is to be granted access to the intranet or if the DTU is to be routed to the policy engine module 90 for further checking.

As noted above, the main tables used by the flow engine modules for verifying incoming DTUs are the flow tables 107 and the listening tables 109. The flow tables have entries denoting the characteristics of DTUs expected for a specific established flow. These entries would have the network interface, the protocol used by the DTU, the destination address, the destination port, the source address, and the source port. The format for a flow table entry may be as follows:

<i, TCP, 207.61.132.17, 80, 10.10.1.210, 1047> where the table fields denote the following:

| | |
|---|---|
| network interface = | I |
| protocol used = | TCP |
| destination address = | 207.61.132.17 |
| destination port = | 80 |
| source addresses = | 10.10.1.210 |
| source port = | 1047. |

The format can therefore be the following:

<[network interface], [protocol], [destination address], [destination port], [source address], [source port]>

Similarly, a listening table entry would have the characteristics for expected DTUs at the beginning of a flow that is allowed according to policy. The listening table entry would have the network interface, protocol, destination address, and destination port of the expected DTU. The format for a listening table entry can thus be:

<[network interface], [protocol], [destination address], [destination port]>

There may be differing numbers of flow tables and listening tables. For example, a single flow table and a single listening table is maintained for the whole system 60 with possible copies of the same flow table being replicated for each flow engine module. Similarly, a single listening table is replicated for each flow engine. When an entry is to be made in either the flow table or the listening table, the policy engine module inserts this entry into all the replicated copies on each of the flow engine modules.

When in use, the system 60 functions with a flow engine module first receiving a DTU from a location external to the system 60. If the DTU originated from the Internet 20, the flow engine module 70A first checks its flow table for matches between the characteristics of the expected DTUs (as documented in the table entries) and the characteristics of the received DTU. If a match is found between the received DTU and an entry in the flow table, then the received DTU is part of a flow already established. As determined by the flow table entry, the received DTU is then forwarded to the appropriate flow engine module for egress to the ultimate destination. If there is not a match between the received DTU and any flow table entries, the DTU is then checked against the listening table. If a match is found between a listening table entry and the received DTU, the received DTU is forwarded to the policy engine module 90. The policy engine module 90 then applies as much checking as its preprogrammed security policy calls for. Depending on the security level the system 60 is configured to provide, the policy engine module 90 will implement a varying number of security checks. Once the received DTU passes the security check, applied by the policy engine module 90, the flow between the source and destination server/PC through the firewall system 60 is finalized. A flow table entry corresponding to the new flow is entered in the flow table. Any incoming DTU for this new flow does not require further checking by the policy engine again. For optimization, a new incoming DTU associated with the established flow can therefore be received and forwarded by an ingress flow engine module to the egress flow engine and then to its final destination without passing through the policy engine module.

For a VPN Security Association, the general approach outlined above is followed. In essence, a VPN Security Association is established between the system 60 and a remote VPN Gateway including hand shaking, exchange of security keys, and coordination in a process known as Internet Key Exchange. Once the VPN Security Association is established, any DTUs received by the system 60 for the VPN Security Association is forwarded to its destination, without the need to pass through the policy engine module 90. However, both the incoming and outgoing DTUs need to pass through the encryption engine module 100 for encryption/decryption and authentication services prior to being forwarded to their destinations As an example of IPSec (Internet Protocol Security) operation, referring to FIG. 3, consider a DTU received by a flow engine module from Intranet 30. It is first checked against the flow/Security Association table to see if there is already an established flow/Security Association in place. If not, it is checked against the listening table. If indeed there is a match with the listening table, the DTU is forwarded to the policy engine module 90. On checking the DTU against the Security Policy Database, the policy engine module 90 determines that not only is the flow associated with the received DTU allowed, IPSec is to be used on the flow. Policy engine module 90 undergoes Internet Key Exchange (IKE) with the distant VPN Gateway to negotiate a set of keys to be used for the new Security Association to be established. Once this is accomplished, the policy engine module enters the information in a new entry in the Security Association Database/flow table. The originally received DTU as well as subsequent DTUs belonging to the same flow, are forwarded to the cryptographic engine module 100 for encryption/decryption, and then to an egress flow engine module and then the final destination. The policy engine module 90 will not be part of the transaction for an incoming DTU after the Security Association setup.

It should be noted that the switch module 80 performs all of the forwarding functions internal to the system 60. A suitable switch module is the Stream Switch described in U.S. patent applications 60/287,577 and 60/283,919 from Nortel Networks incorporated herein by reference. Ideally, the switch module operates on streams of data that can be either byte or datagram streams. Each stream has parameters that denote eligibility criteria (amount of data which must be available on the stream and protocol events), priority (scheduling of presentation of the stream to its destination or "consumer") and destination (the "consumer" of the stream or the module that should receive the stream). Such a switch can redirect a stream by changing the stream's destination/consumer. Similarly, criteria can be set for a stream such that the stream will revert to a specific destination/consumer when the criteria are met.

It should be further noted that other firewall functions, such as network address translation, can be implemented through the flow engine module. When a flow engine module receives an incoming DTU which matches a flow table entry, the flow engine module can perform address translation on the received DTU. To provide a high level of security to the intranet and to foil attacks on the intranet based on malformed DTUs, the flow engine modules in system 60 can implement full TCP termination, which includes IP fragment reassembly as a pre-requisite, if required.

As examples of processes which the system 60 can implement to provide both high security and high throughput, the following scenarios and their corresponding processes are presented. It should be noted that SYN (synchronize) and ACK (acknowledge) will be used in the following description as these are accepted terms for synchronize DTUs and acknowledge DTUs.

Figure 4A:
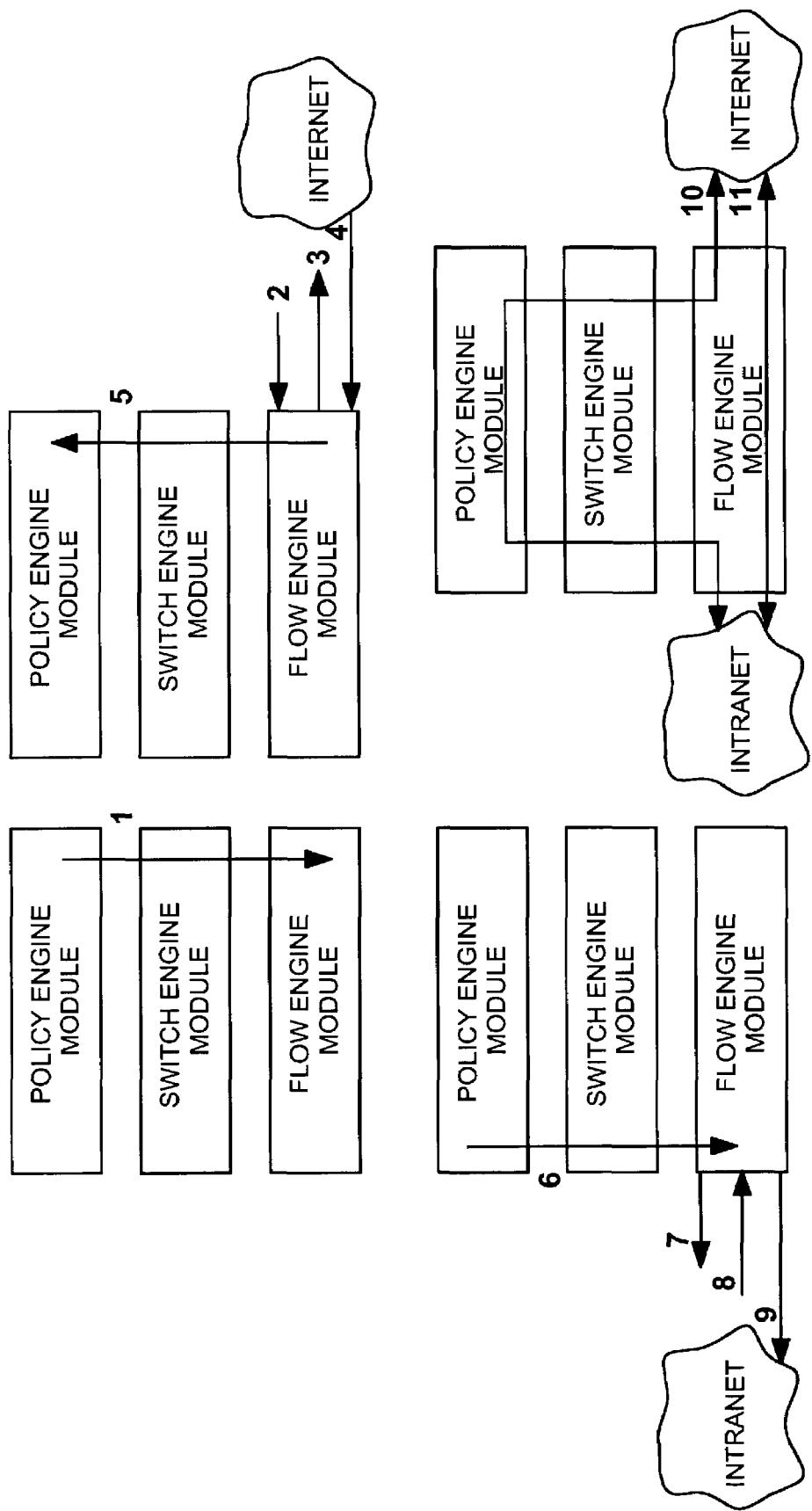
FIGS. 4A-4I are block diagrams illustrating data flows for a variety of processes implemented by the invention for specific scenarios.

Scenario 1:

Accessing a Web Server behind the Firewall from the Internet (See FIG. 4A where the numbers in the Figure correspond to numbers in the process) It should be noted that while FIG. 4A illustrates an external user (from the Internet) accessing a Webs Server inside the intranet, the Web Server may be located in a DMZ instead of within the actual intranet. While the DMZ is not a necessary component, most system configurations will use a DMZ to contain the Web Server as an added security measure. Thus, FIG. 4A can be interpreted such that the left side (labeled intranet) may be seen as either an intranet or a DMZ which contains the Web Server.

Steps:

1) Policy Engine sets up an entry in the listening table with the following parameters:

| | |
|---|---|
| Protocol = | TCP |
| destination address = | Web Server external public address (eg 216.188.92.3) |
| destination port = | 80 |
| network interface = | Internet |
| table entry = | <TCP, Web Server external address, 80, Internet> |

2) A flow engine receives a TCP SYNC DTU on the Internet Network Interface with the following characteristics:

| | |
|---|---|
| destination address = | Web Server external address (e.g 216.188.92.3) |
| Destination port = | 80 |
| Source address = | client address (e.g. 217.85.63.2) |
| source port = | client port number |

3) The flow engine sends an acknowledgement of the SYN DTU (a SYN ACK DTU is sent)
4) The flow engine receives an acknowledgement of the SYN ACK DTU.
5) This an indication to the policy engine that a connection it is expecting is now open. (There should now be a flow table entry with parameters indicated in step 2 on the Internet Network Interface. The mechanism of creating the entry is implementation-dependent. This flow table entry is for data flow going towards the Web Server from the Internet.)
6) The policy engine requests a connection to the Web Server behind the firewall with the following parameters:

<TCP, dest-IP=Web Server private addr, dst-port=80, source IP=client addr, source port=client port #, network interface=system interface to server>

7) The flow engine sends a SYN DTU (synchronize DTU with the proper parameter) to the Web Server
8) The Web Server returns a SYN ACK DTU which is received by the flow engine
9) The flow engine sends an ACK DTU to the Web Server
10) This indicates that data transfer between the client and the Web Server is now enabled through the firewall system, albeit through the policy engine. Note that at this stage, there is also a new flow table entry with parameters indicated in step 8 on the Intranet Network Interface. The new flow table entry relates to data flow from the Web Server going towards the Internet.

11) For optimization, the policy engine can instruct the system such that flow engine(s) can continue on with the data transfer without its involvement.

It should be noted that steps 1-10 are standard TCP connection and data transfer steps. Furthermore, it should be noted that, the Web Server has two addresses—an external address to which the Internet located client is attempting to connect and an internal/private address that the flow engine uses to forward DTUs.

Figure 4B:
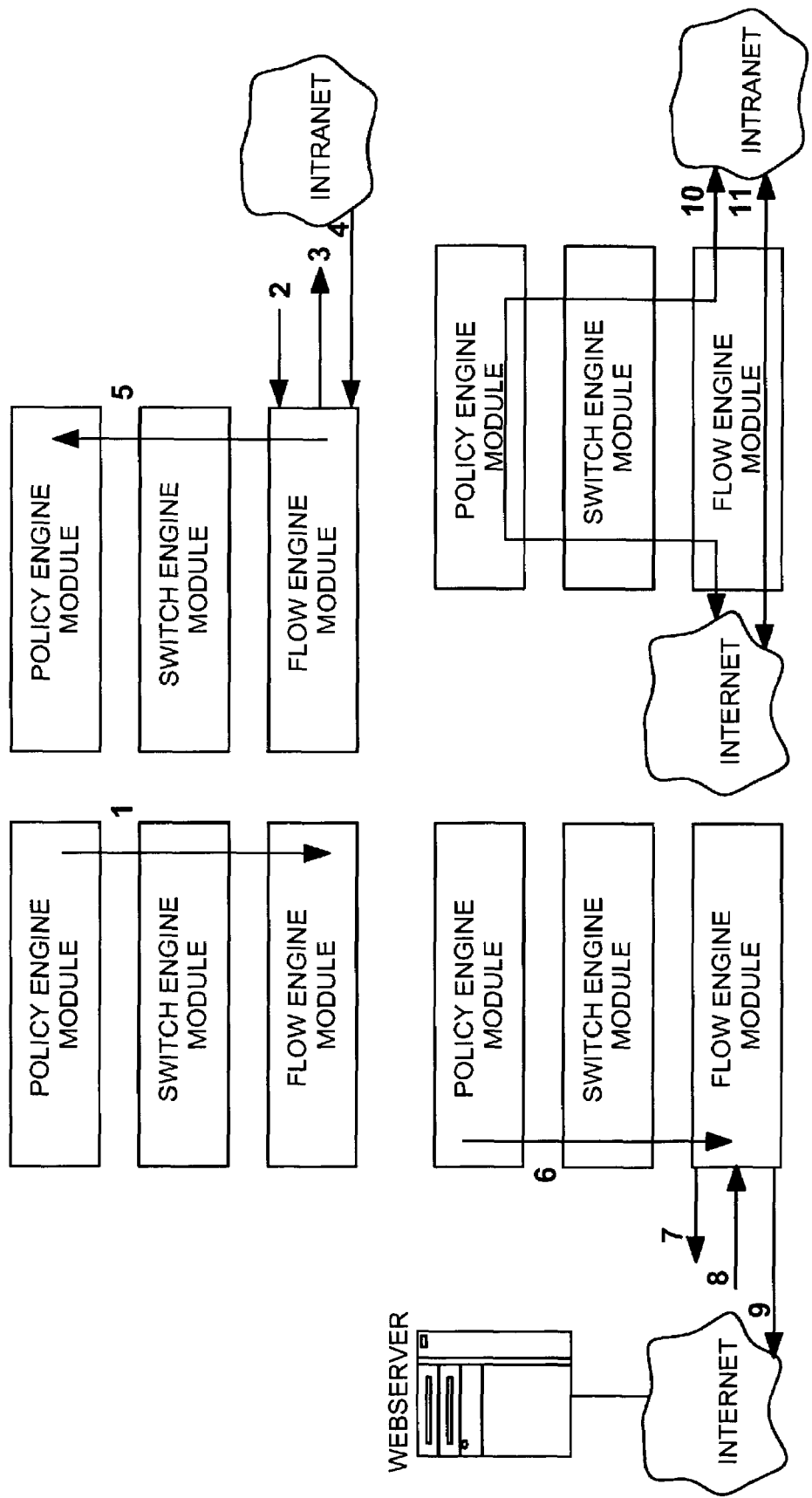

Scenario 2: Accessing a Web Server on the Internet from the intranet (behind the firewall). FIG. 4B illustrates the steps outlined below with the number in the figures denoting the step corresponding to the data arrow showing the direction of data flow as well as request/indication between components within the system. For this scenario, the destination address is not known but the destination port is known. The destination port 80 is defined in industry accepted protocols as being reserved for HTTP (hyper Text Transfer Protocol) connections.

Steps:

1) Policy engine adds an entry in the listening table with an undetermined destination address.

| | |
|---|---|
| Protocol = | TCP |
| Destination address = | * (unknown) |
| Destination port = | 80 |
| Network interface = | network interface on the intranet |

2) A SYN DTU from the intranet is received by the flow engine with the following characteristics:

| | |
|---|---|
| destination address = | web server public external address (external to the firewall) |
| Destination port = | 80 |
| Source address = | intranet client private address |
| Source port = | intranet client port |

Since this SYN DTU corresponds to the listening table entry set up in step 1 above, then this DTU is acknowledged.

3) SYN ACK DTU sent to intranet client from flow engine
4) ACK DTU received by flow engine from intranet client
5) The policy engine is notified that a connection it is expecting is now open.
6) The policy engine requests a connection to the destination external web server using the following parameters:

| | |
|---|---|
| Protocol = | TCP |
| Destination address = | Web Server public external addr |
| Destination port = | 80 |
| Source address = | intranet client public address |
| Source port = | to be assigned by flow engine |
| Network interface = | network interface on the Internet |

7) SYN DTU sent by flow engine using parameters sent by policy engine with an assigned source port number
8) SYN ACK DTU received by flow engine to external web server
9) ACK DTU sent by flow engine to external web server
10) data transfer between web server and intranet client through the firewall system with the data (DTUs) passing through the policy engine is now fully enabled. Both flow table entries are fully in place.

11) For optimization, the policy engine can instruct the system such that data transfer between the Web Server and the intranet client with the DTUs only passing through the flow engine and not the policy engine.

Figure 4C:
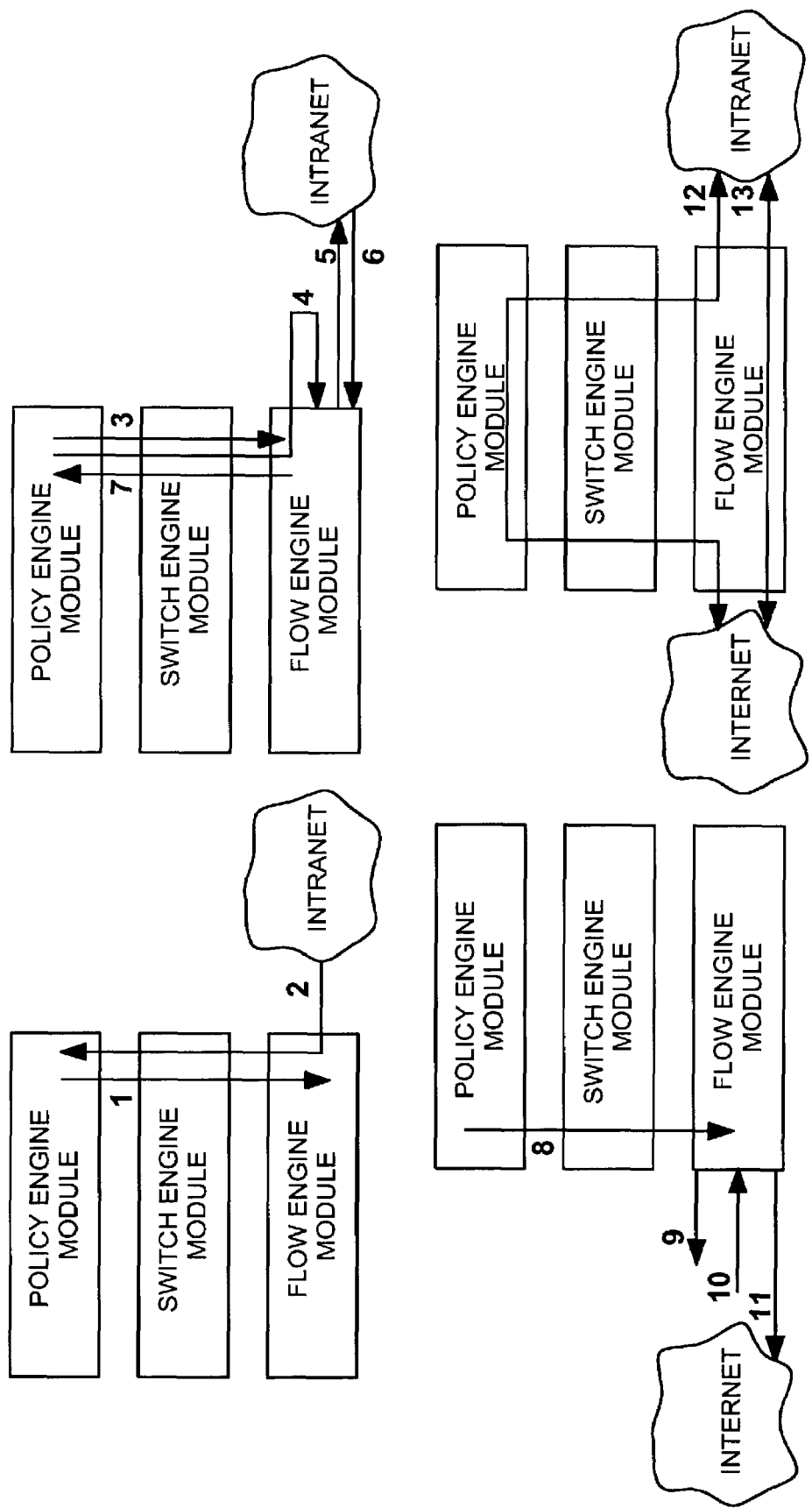

Scenario 3: Outgoing TCP Circuit Gateway setup (See FIG. 4C for this scenario). Since the system 60 is configured to forward to the policy engine any unknown/unrecognized DTUs, any unknown/unrecognized DTU could be a legitimate SYN DTU. These DTUs can be recognized by the policy engine and can be "recycled" or rerouted back to the input port of the flow engine after setting up a listening table entry. The effect of the "recycling" of the DTU would be to provide the system with a DTU it expects. Once the "recycled" DTU has been received again (to correspond to the listening table entry), a similar process to that in scenario 1 is contemplated. The steps for this current scenario are as follows:

Steps:

1) Policy engine notifies system that it wants to receive any unknown DTUs from the intranet.
2) Flow engine receives an unknown DTU from the intranet. This unknown DTU is forwarded to the policy engine for processing.
3) The policy engine recognizes the unknown DTU as being a legitimate SYN DTU. The policy engine then inserts an entry in the listening table. The new entry will correspond to the characteristics of the previously unknown DTU as follows:

| | |
|---|---|
| Protocol = | TCP |
| Destination address = | addr of remote server |
| Destination port = | port of remote server |
| Network interface = | interface for intranet |

4) The now identified SYN DTU is then rerouted back to the flow engine which originally received it. This SYN DTU is then routed to the intranet network interface and is therefore treated by the flow engine as a newly arrived DTU.
5) Since the SYN DTU matches the entry of the listening table set up specifically for it, the flow engine responds with a SYN ACK.
6) The client responds with an ACK DTU.
7) The policy engine is notified that the connection it is expecting is now open.
8) With the one connection of the TCP circuit gateway open, the policy engine requests setting up a connection to the remote server using the following parameters:

| | |
|---|---|
| Protocol = | TCP |
| Destination address = | addr of remote server |
| Destination port = | port of remote server |
| Source address = | intranet client public address |
| Source port = | to be assigned by flow engine |

9) The flow engine sends out a SYN DTU with the parameters specified by the policy engine with a source port assigned.
10) A SYN ACK DTU is received by the flow engine
11) The flow engine acknowledges the DTU from the remote server with an ACK DTU.

12) With the handshaking between the system and the remote server done, data transfer can occur between the intranet client and the remote server, albeit involving the policy engine.

13) For optimization, policy server can requests direct data transfer between the two flow engines for subsequent DTUs.

File Transfer Protocol (FTP) uses a control connection and a data connection. The control connection is a typical "server" connection with a well-known port number (21) and published IP address. The data connection is a dynamic TCP connection with a (possibly) previously unknown IP address and port numbers, the address and port number generally being negotiated in the control connection. The policy engine can examine the FTP command to determine the IP address and port number to be used for the FTP data connection. The policy engine can then request opening up this FTP connection, and only this FTP connection for data transfers to the FTP server on the other end of the connection, for the data transfer.

Figure 4D:
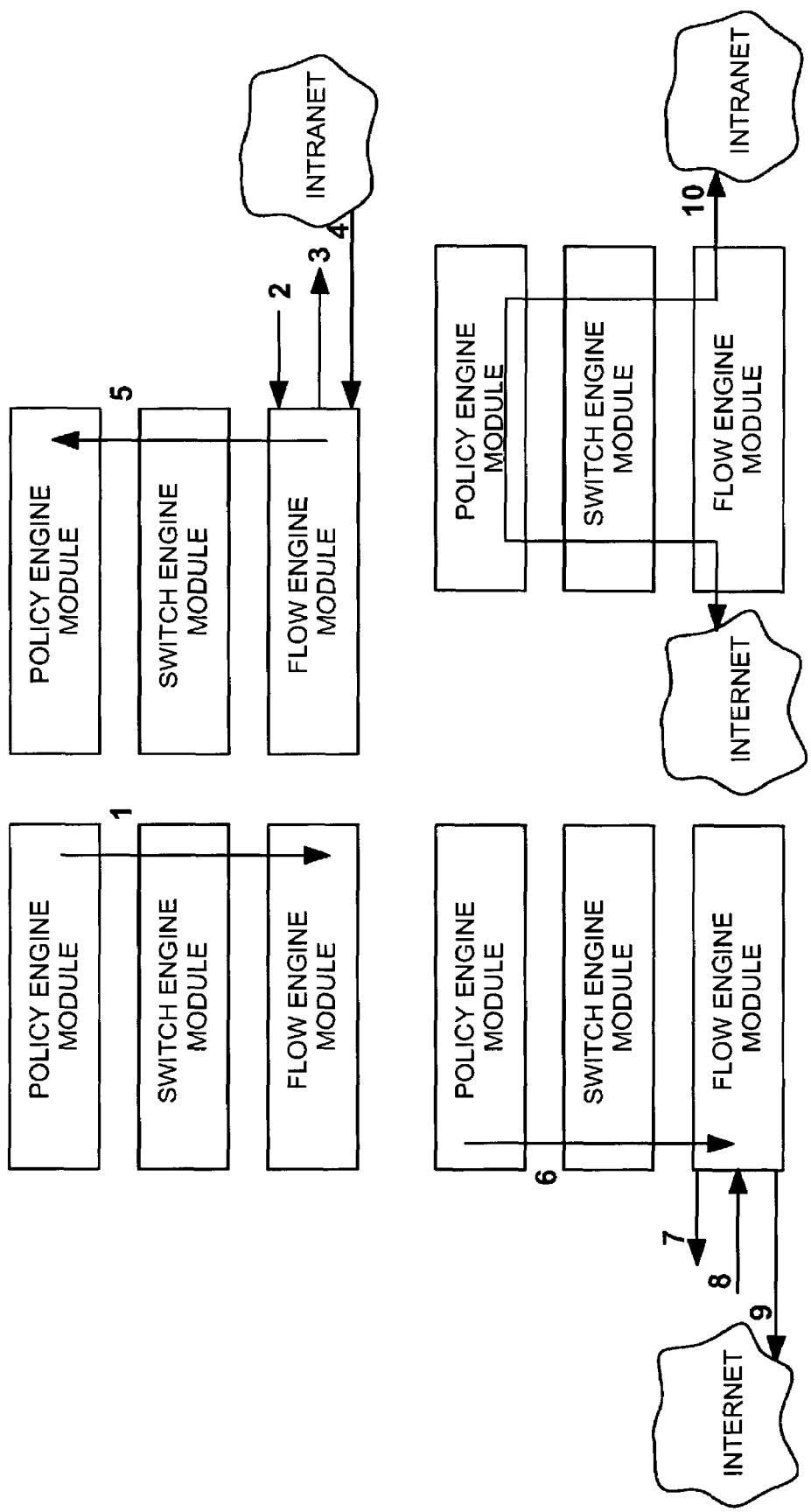

To illustrate the FTP process that the system can implement, the following scenario is presented:

Scenario 4: FTP Proxy—Control Connection (See FIG. 4D)

To set up an FTP control connection between a client behind the firewall (in the intranet) and an external server on the Internet, the following steps are executed:

Steps:

1) The policy engine inserts a listening table entry that will match any FTP connection SYN DTU coming from the intranet. The parameters for this entry are:

| | |
|---|---|
| Protocol = | TCP |
| Destination address = | * (any) |
| Destination port = | 21 (the port for FTP connections) |

2) A SYN DTU is received by the flow engine from an intranet client wishing to establish an FTP connection to an external FTP server.

3) The flow engine sends an acknowledgment of the SYN DTU (SYN ACK DTU) to the intranet client.

4) An acknowledgment from the intranet client is received by the flow engine (ACK DTU)

5) The policy engine is notified that the connection it is expecting (FTP connection from intranet client) is now open.

6) With client connection established, the server connection needs to be established. To accomplish this, the policy engine initiates contact with the destination FTP external server by instructing the flow engine to connect with the FTP server. The parameters are as follows:

| | |
|---|---|
| Protocol = | TCP |
| Destination address = | FTP server address |
| Destination port = | 21 |
| Source address = | intranet client public address |
| Source port = | to be assigned by flow engine |
| Network interface = | flow engine interface to Internet |

7) Following the instructions of the policy engine, the flow engine sends out a SYN DTU with the proper parameters as set out in step 6 with a properly assigned port number.

8) A SYN ACK DTU is received by the flow engine from the remote FTP server.

9) The flow engine sends an ACK DTU to the remote FTP server.

10) Data exchange, with the DTUs containing FTP control information, between the remote FTP sever and the intranet client through the policy server is now fully enabled. The data (control info) passes through the policy engine which checks for FTP commands such as PORT, PASV, RTRV, STOR.

It should be noted that the above process is used to establish an FTP control connection between the external FTP server and the intranet client behind the firewall. This connection is only for the transfer of commands or control information related to the FTP connection. The optimization of the data transfer between the FTP server and the intranet client is not performed for scenario 4. This is because the policy engine needs to be able to examine the incoming DTUs for the FTP commands. The process for the transfer of actual data between the FTP server and the intranet client is presented in the next scenario.

Scenario 5: FTP Proxy—Data Connection

Figure 4E:
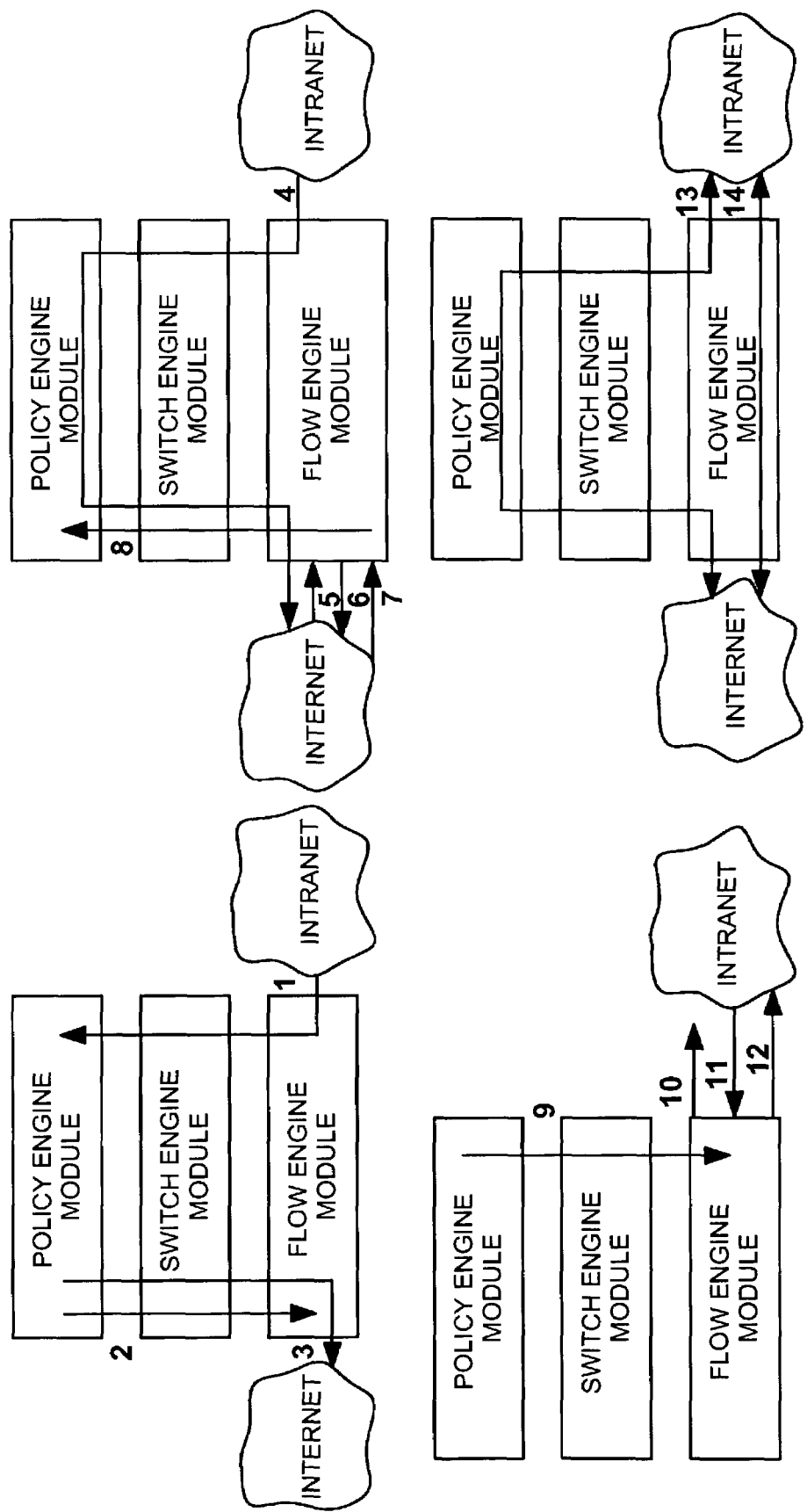

While scenario 4 illustrated the process for exchanging control connection data for FTP connections, a similar process is used for the actual data connections between the external FTP server and the intranet client. In essence the client issues a PORT command to the FTP external server. The PORT command will contain the intranet destination address and port number. The FTP server then opens a connection and data can flow between the intranet client and the FTP server. The following steps, in conjunction with the diagrams in FIG. 4E, illustrate this process for establishing an FTP data connection.

Steps:

1) The intranet client issues a PORT command carried in a data DTU intended for the FTP external server but received by the flow engine and the policy engine. The PORT command will contain the private address of an intranet client and port number which will receive data from the external FTP server.

2) The policy engine then inserts a flow table entry that will match any incoming DTUs from the external FTP server for this specific connection. The parameters for this entry are:

| | |
|---|---|
| Protocol = | TCP |
| Destination address = | intranet client public address |
| Destination port = | to be assigned by the flow engine |
| Source address = | FTP server address |
| Source port = | 21 |
| Network interface = | network interface on Internet |

3) The policy engine modifies the PORT command parameters as follows:
destination address: intranet client public address, destination port: port assigned by the flow engine in step 2. The DTU containing the (modified) PORT command is then allowed to proceed to the destination server through the flow engine.

4) a RTRV or STOR type command (to retrieve data from or store data to the FTP server) is then transmitted, by way of the flow engine and the policy engine, to the FTP server. This type of command will trigger the remote FTP server to set up the data connection.

5) Once the command in step 4 is received by the FTP server, the FTP server initiates a handshaking sequence. This is started by the flow engine receiving a SYN DTU from the FTP server with the following parameters:

Destination address = intranet client public address
Destination port = assigned port by flow engine in step 3
Source address = FTP server address
Source port = 21 (default, server may use dynamic port number)

6) The flow engine, as part of the 3 part handshaking process, sends a SYN ACK DTU to the remote FTP server.
7) The FTP server responds with and ACK DTU to the flow engine.
8) A connection to the policy engine from the FTP server is opened.
9) The policy engine requests a connection to the intranet client with the following parameters:

Protocol = TCP
Destination address = data IP address in PORT command in step 1
Destination port = data IP port in PORT command in step 1
Source address = FTP server address
Source port = 21
Network interface = network interface on Intranet.

10) To establish the connection to the intranet client, the flow engine sends a SYN DTU to the intranet client as part of a handshaking procedure.
11) A SYN ACK DTU is then received by the flow engine from the intranet client.
12) An ACK DTU is sent by the flow engine in response to the SYN ACK DTU.
13) With the handshaking procedure complete, FTP data transfer can now proceed via the policy engine.
14) For optimization, the policy engine can instruct the system to undergo data transfer without the policy engine's involvement, if appropriate.

Depending on the type of service required, step 14 may or may not be implemented. As an example, if the policy engine is configured to provide virus scanning, then the data flow must always necessarily pass through the policy engine so that the data may be checked for viruses. For such a case, the whole file being transferred is sent completely to the policy engine. The policy engine then performs virus checking on the file and, if the file passes the virus check, only then is the file forwarded to the flow engine for forwarding to the intranet client or the FTP server.

The method of supporting a client communicating with a server with known address and port number using UDP protocol through the firewall is illustrated in Scenario 6.

Figure 4F:
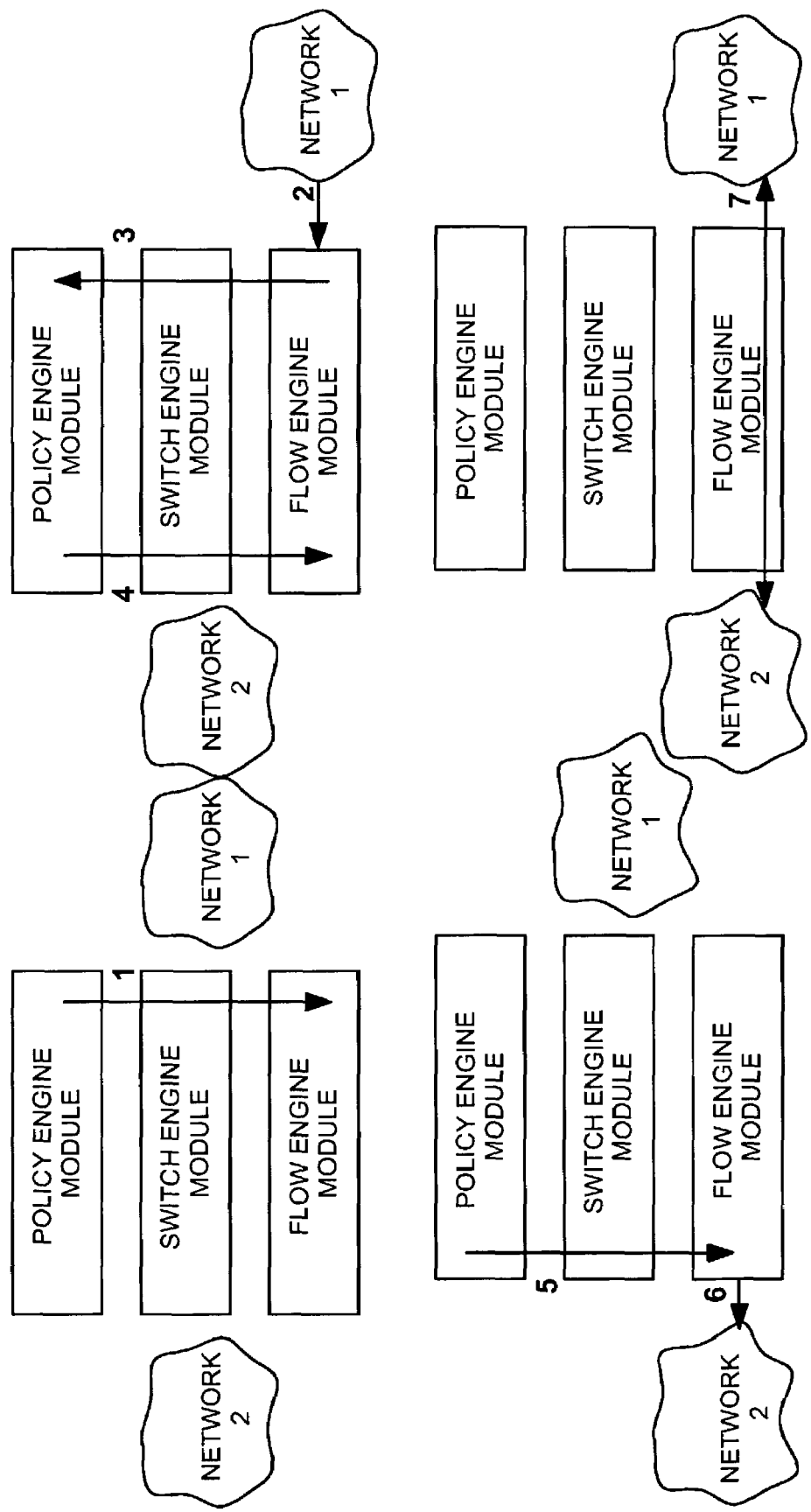

Scenario 6: The following steps are illustrated in FIG. 4F. For this process it is assumed that the firewall is cognizant of the address of the remote end of the connection. As can be seen from the figure, the firewall acts as the interface between the two networks, NETWORK 1 and NETWORK 2. For simplicity, Scenario 6 assumes that no Network Address Translation is required.

Steps:
1) The policy engine inserts an entry into the listening table. The parameters of the entry are:

Protocol: UDP
Destination address: configured remote address (the known address of the remote server)
Destination port: configured port for the remote address
Network interface: network interface to NETWORK 1

2) The flow engine receives a datagram/DTU from NETWORK 1 that matches the listening table entry inserted in step 1.
3) The policy engine receives the datagram/DTU from the flow engine. (At this stage, a new flow entry matching the parameters in step 2 should be in place for Network 1,)
4) The policy engine requests setting up a "connection" to the remote server with the following parameters:

Protocol: UDP
Destination address: configured remote address
Destination port: configured port for the remote address
Source address: address of the NETWORK 1 client which sent the datagram/DTU
Source port: port number for the NETWORK 1 client
Network interface: network interface for NETWORK 2

(At this stage, a new flow entry matching the parameters in step 4—with source and destination addresses and port numbers reversed—should be in place for Network 2).

5) The policy engine requests sending the datagram received in step 3.
6) The datagram/DTU is sent by the flow engine to the remote server.
7) With the communication between the client and server enabled through the firewall system albeit through the policy engine, the policy engine can request the system to optimize the data transfer: any subsequent datagram/DTUs sent between the two ends of the "connection" are handled without the intervention of the policy engine. Such a transfer scheme would provide faster, more efficient communications between the two ends of the connection.

The method of supporting client communicating with server with unknown address but known port number using UDP protocol through the firewall is illustrated in scenario 7.

Scenario 7: UDP Connection without Configured Address

Figure 4G:
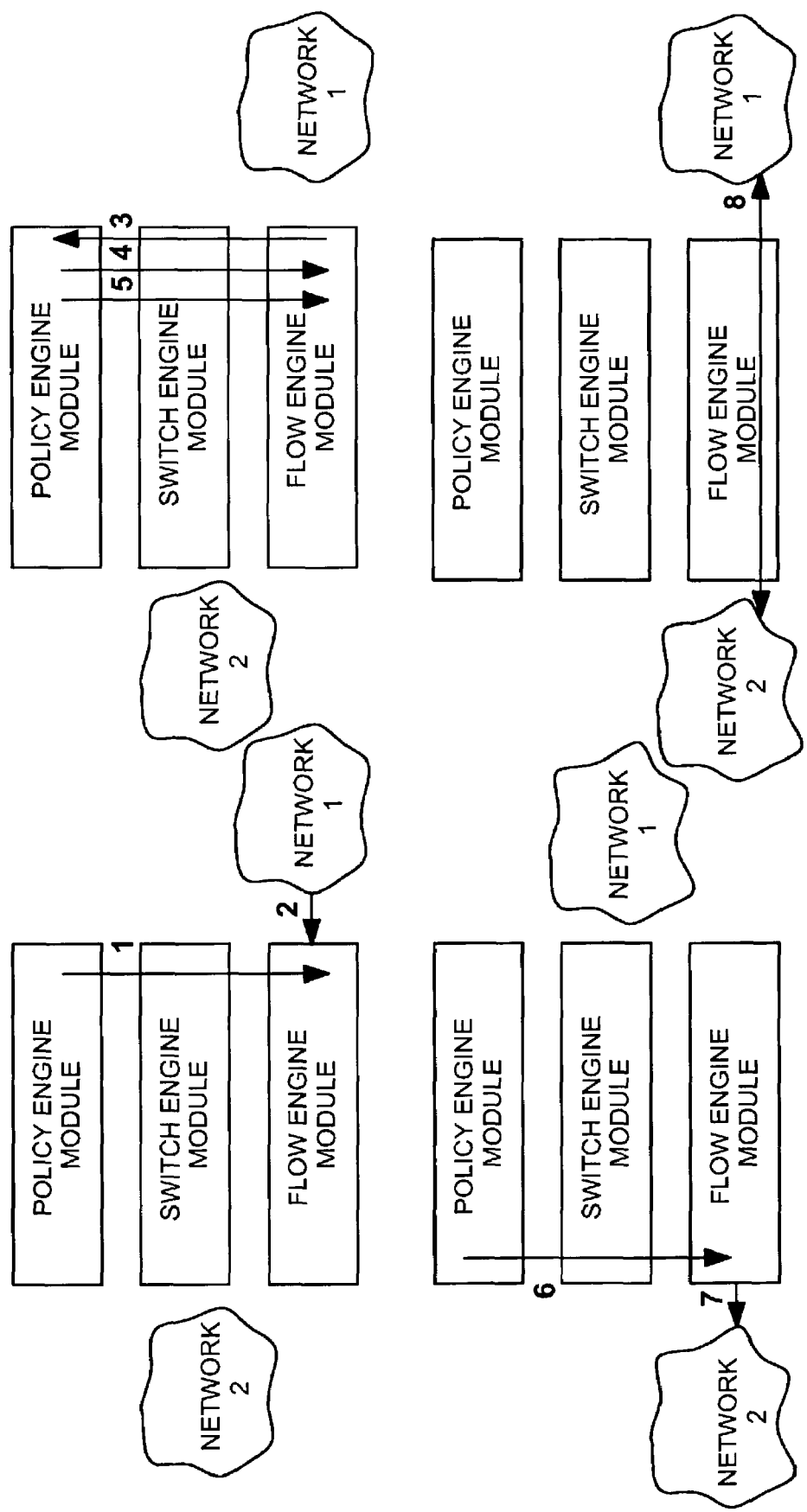

The process outlined below is to be read in conjunction with FIG. 4G. It should be noted that for this scenario, as in scenario 6, the destination port is known and defined in previously defined security policy.

Steps:
1) The policy engine inserts an entry into the listening table with the following parameters:

Protocol: UDP
destination address: * (Unknown—unspecified)
Destination port: configured port number
Network interface: network interface on NETWORK 1

2) The flow engine receives a UDP datagram/DTU from NETWORK 1 that matches the entry in the listening table inserted in step 1 above.
3) The flow engine notifies the policy engine of the UDP datagram/DTU received. (At this stage, a new flow table entry matching the parameters in step 2 should be in place. The implementation of table entry creation can be via automatic creation on reception of a packet matching the listening table entry, or via step 4 below).

4) The policy engine then requests a "connection" to the NETWORK 1 source of the UDP datagram/DTU. This has the effect of setting up a flow table entry. The parameters are:

| | |
|---|---|
| Protocol: | UDP |
| Destination address: | NETWORK 1 client address |
| Destination port: | client port number |
| Network interface: | network interface for NETWORK 1 |
| source address: | NETWORK 2 server address |
| source port: | configured port on NETWORK 2 server |

5) The policy engine then requests a "connection" to the NETWORK 2 destination of the UDP datagram/DTU received in step 2. This has the effect of setting up a flow table entry. The parameters for the flow table entry are:

| | |
|---|---|
| Protocol: | UDP |
| Destination address: | NETWORK 2 server address |
| Destination port: | configured port on NETWORK 2 server |
| source address: | NETWORK 1 client address |
| Source port: | client port on NETWORK 1 |
| Network interface: | network interface for NETWORK 2 |

(At this stage, a new flow table entry on Network 2 is also in place).

6) The policy engine requests sending the datagram received in step 3
7) Based on the request from the policy engine in step 6, the flow engine sends the UDP datagram/DTU to the NETWORK 2 server.
8) As an optimization, any subsequent UDP datagram/DTUs can be handled purely by the flow engine without any intervention from the policy engine.

A third type of UDP "connection" is one in which neither the destination port nor the destination address are previously known to the policy engine. An example of a security policy calling for this kind of "connection" is "permit all UDP services from the intranet to the internet". This type of UDP connection is implemented in Scenario 8.

Scenario 8: Outgoing UDP Virtual Connection

Figure 4H:
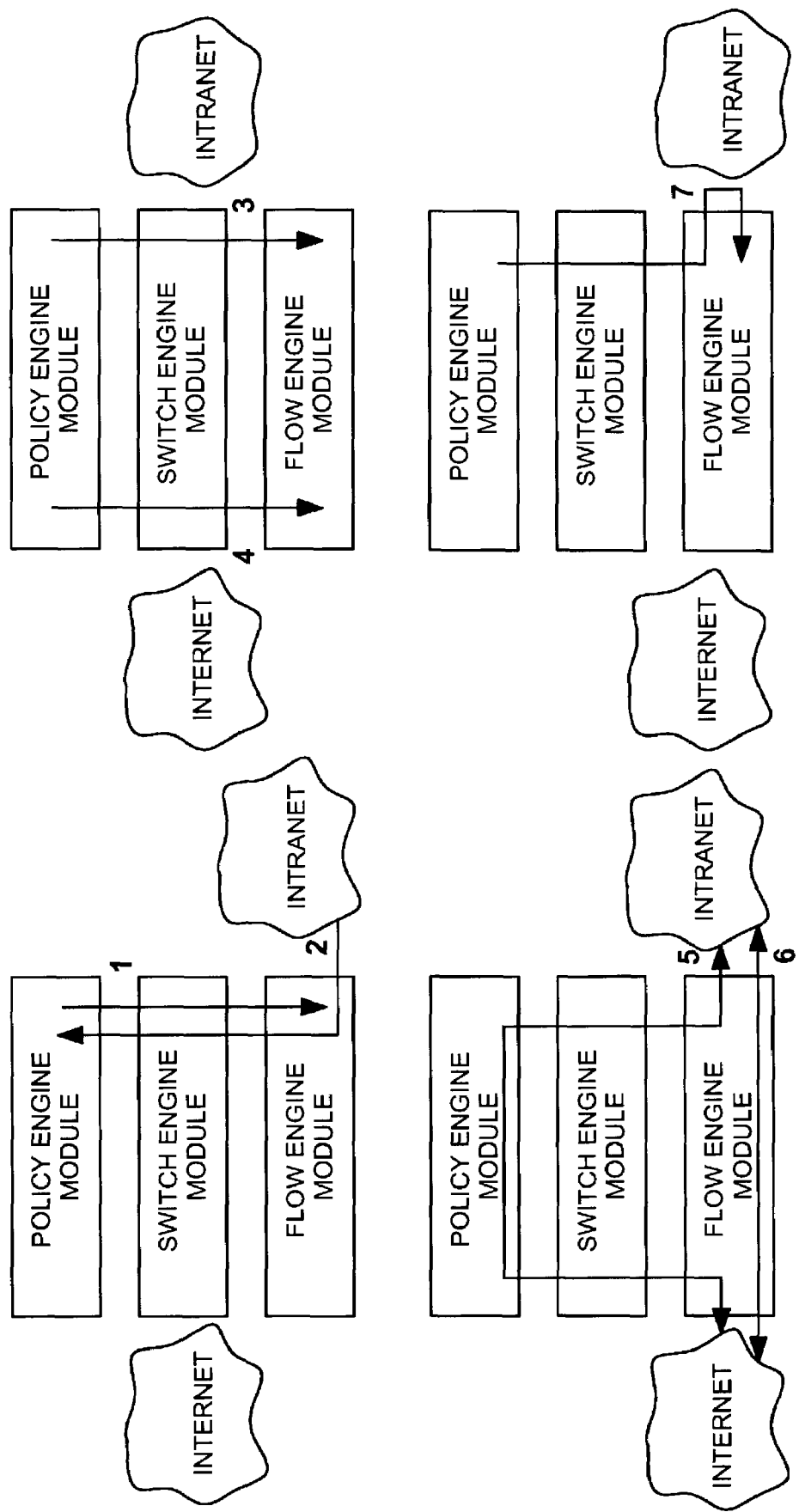

For this scenario, a client in the intranet behind the firewall wishes to establish a UDP connection with a server in the Internet. The firewall is not cognizant of the addresses or the ports of either end of the UDP connection. The steps outlined below are schematically illustrated in FIG. 4H.

Steps:
1) To be notified of any intranet clients wanting a UDP connection, the policy engine commands the system that any unknown DTUs received from the intranet are to be sent to the policy engine by the flow engine.
2) The flow engine receives an unknown DTU from the intranet. This DTU is then forwarded to the policy engine in accordance with step 1.
3) The policy engine recognizes the DTU to be a legitimate UDP datagram/DTU and sets up a "connection" for any incoming UDP datagram/DTUs that may be received in the future in response to the received datagram/DTU.

The parameters of the connection (a flow table entry) are:

| | |
|---|---|
| Protocol: | UDP |
| Destination address: | local/private address of intranet client |
| Destination port: | port for intranet client |
| Source address: | remote address of the Internet server |
| Source port: | port for the Internet server |
| Network interface: | network interface on Intranet |

Note that the request for connection has the effect of setting up a corresponding flow table entry.

4) The "connection" to the Internet server is configured. The policy engine requests a "connection" to be made with the following parameters (This has the effect of sending up a flow table entry):

| | |
|---|---|
| Protocol: | UDP |
| destination address: | remote address of Internet server |
| destination port: | port for remote Internet server |
| source addresses: | public address for intranet client (or to be assigned) |
| Source port: | to be assigned by the flow engine |
| Network interface: | network interface on Internet |

5) With both of the "connections" established, the initial data transfer path (with the policy engine intervening) is now ready.
6) This represents the optimized data transfer path, without the policy engine intervention, if the policy engine requests the system to do so.
7) Since the data transfer paths are ready and configured, any data transfer can occur. The datagram received by the policy engine in step 2 is "recycled" back to the intranet interface. Since the relevant table entries were inserted in steps 3 and 4, the datagram/DTU is routed to its destination—the remote Internet server.

Scenario 9: Another possible scenario involves dynamic UDP connections. Such connections are used by the popular messaging, video and voice application implemented over the Internet. Such an application can use both proper TCP connections and UDP virtual connections as explained above. For the NetMeeting application, some port numbers are statically assigned while others are dynamically assigned.

For such applications, the application proxy can be similar to that of the FTP proxy in that the firewall software can interpret the application data to find the address and port number to be used for the dynamic connection.

Figure 4I:
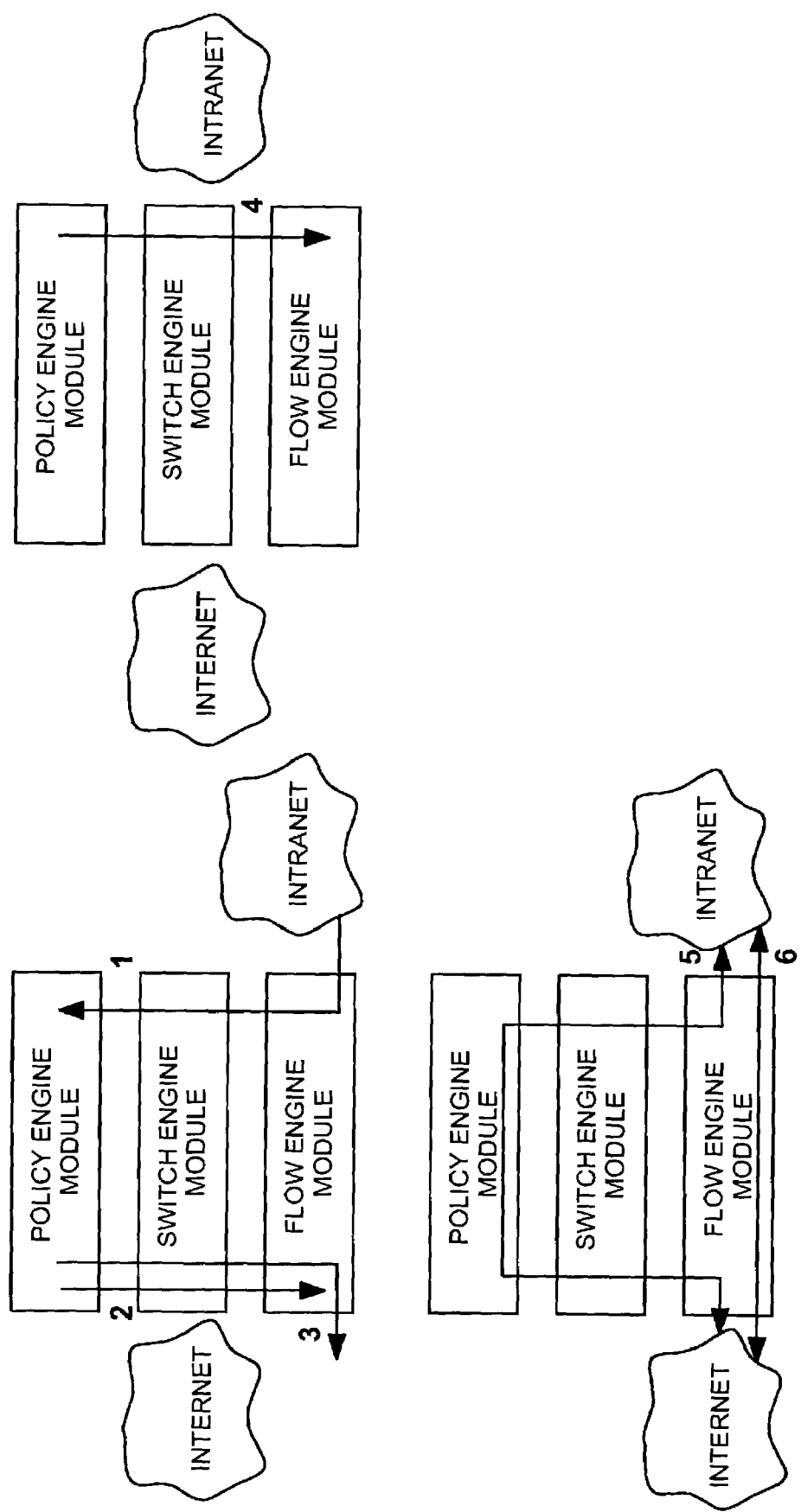

To enable dynamic UDP connections using the system explained above, the following steps are taken (see FIG. 4I);

Steps:
1) A control DTU with an embedded local address and port number (local-address, local port #) is received by a flow engine from the intranet.
2) The policy engine sets up a flow table entry for entering DTUs whose destination is the local address and port number embedded in the control DTU received in Step 1. The flow table entry characteristics are:

| | |
|---|---|
| Protocol: | UDP |
| Destination address: | public address of the intranet client |
| Destination port: | to be assigned |
| Source address: | remote address of the Internet server |
| Source port: | port for the Internet server |
| Network interface: | network interface on the Internet |

-continued

3) A control message with the translated local address and the translated local port is then sent out to the Internet server.
4) A flow table entry for DTUs from the intranet client is then set up by the policy engine. The flow table entry will have the following characteristics:

| | |
|---|---|
| Protocol: | UDP |
| Destination address: | remote address of the Internet server |
| Destination port: | remote port for the Internet server |
| Source address: | local address of the intranet client |
| Source port: | local port number for the intranet client |
| Network interface: | network interface on the intranet |

Data is transferred between the intranet client and the Internet server with the data passing through the policy engine.

5) For optimization, subsequent data transfers can be effected without the intervention of the policy engine.

To terminate the UDP connection, the system can, similar to other firewalls, implement a timing mechanism. As an example, if no data is transferred for a predetermined amount of time, the virtual connection is removed.

All of the above scenarios are presented as example of the function and processes that the system firewall can implement.

Figure 5:
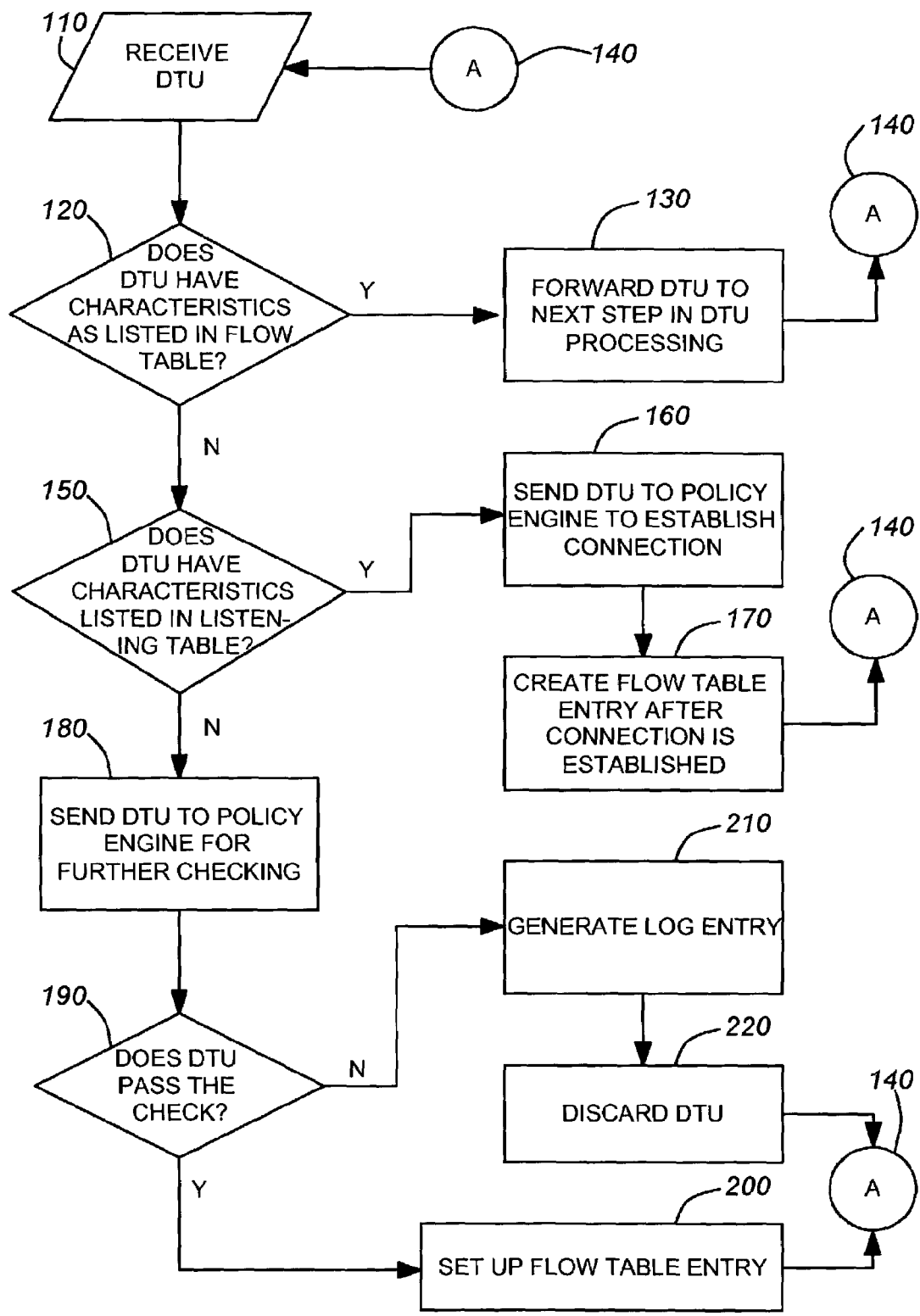
FIG. 5 is a flow chart detailing the steps executed by the system in FIG. 3 according to another aspect of the invention.

The generic process executed by the system 60 is that illustrated in FIG. 5. For the system's VPN functions, the system implements the IPSec (Internet Protocol (IP) Security) protocols as defined and explained in the document RFC 2401 ("Security Architecture for the Internet Protocol") widely available on the Internet and incorporated herein by reference. As explained in that document, within the intranet, DTUs originating at a first intranet and destined for a second, remote intranet connected to the first intranet by the Internet are protectively encapsulated. Essentially, this internal DTU with its IP header and IP payload, is placed within another external DTU with its own new IP header. This external DTU is provided with an ESP (Encapsulated Security Payload) header and trailer with the internal DTU being placed between these two. The data between these ESP delineators, the data consisting of the internal DTU, is encrypted prior to traversing the Internet. Once received at the second, remote intranet, the protective encapsulation is removed and the data is decrypted to reveal the internal DTU with it's own IP headers and payload.

The security architecture outlined in RFC 2401 uses a number of concepts which must first be explained for a better understanding of the VPN functions of the system. The architecture uses, among others, the concepts of an SA (Security Association), and SPD (Security Policy Database), and an SAD (Security Association Database). An SA is defined as a one-way connection that provides security to the traffic that travels along the connection. Thus, for a bi-directional VPN link between two intranets, two SAs must be defined—one for each direction. An SA is identified by three identifiers—an SPI (Security Parameter Index), an IP Destination Address, and a security protocol identifier. For the embodiment being explained, the security protocol being used for the VPN functions is ESP. However, other security protocols, such as the protocol known as AH (Authentication Header) may be used. An SAD is a database that contains the parameters associated with each active SAs. The SPD is a database that contains security policies which will determine the disposition of any incoming or outgoing DTUs. Each security policy entry contains selector values that define the set of IP traffic to which the security policy entry applies. Thus, each policy entry will contain an identification of whether IP traffic to which the policy entry applies will be discarded, be processed using IPSec, or will bypass further processing. If the IP traffic is to be processed, the entry will also contain at least one SA Specification which will list the protocols, mode, and algorithms which will be used.

Another concept used by RFC 2401 is that of selectors. Selectors are sets of IP and upper layer protocol field values that are used by the SPD to match traffic (DTUs) to a specific policy and hence to a specific SA or group of SAs.

Any incoming DTUs on a VPN link will, according to RFC 2401, be processed by the following steps:
1) IP fragments are reassembled into an IP DTU—this step may be required due to the possibility of external DTUs being fragmented for their transport between the first local intranet and the second remote intranet.
2) The External DTU's destination address from it's IP header, its IPSec protocol and it's SPI (from the ESP header) are used to find the relevant SA from the SAD.
3) Once the SA is found, its parameters are read from the SAD and the external DTU is processed according to the IPSec protocol; this includes decrypting the internal DTU and authenticating the external DTU.
4) The SPD is then searched for a security policy entry that matches the internal DTU received.
5) A check is then performed determining if the proper IPSec processing has been applied. This is done by verifying that the SA found in step 2 matches the kind and order of SA's required by the policy found in step 4.

The above steps are performed by the various modules in the system.

Step 1 is performed by the flow engine modules

Step 2 is also performed by a flow engine module. The databases are stored in the system memory. After extracting the relevant data from the external DTU reassembled in step 1, the flow engine module checks the SAD in the system memory.

Step 3 is performed by a combination of modules. The flow engine module creates a header containing the relevant SA parameters retrieved from the SAD in step 2. This header and the external DTU reassembled in step 1 are then forwarded to the crypto engine module through the switch module. The crypto engine module, using the SA parameters in the header, authenticates the external DTU and decrypts the payload (the internal DTU) of the external DTU. The decrypted DTU is forwarded by the crypto engine module back to the relevant flow engine module using the switch module.

Step 4 is performed by the flow engine module after receiving the decrypted DTU from the crypto engine module. Step 5 is again performed by the flow engine module. After step 5 is passed, flow engine module then forwards the internal DTU decrypted from the external DTU to the intranet.

For outgoing DTUs, a similar process is followed. According to RFC 2401, the following steps are taken to process outgoing DTUs:
1) Match the selector fields of an internal DTU against the outbound security policies in the SPD. The first appropriate policy will point to zero or more SAs or groups of SAs (termed SA bundles in RFC2401) in the SAD.
2) Match the selector fields of the internal DTU against the selector fields of the SAs found in step 1. If no SA matches, then an SA or an SA group is created including inserting an appropriate SAD entry corresponding to the SA or SA group and the SPD entry found in step 1 will be linked to the new SAD entry. If no key management entity is found, the internal DTU is discarded.

3) The SA group found/created in step 2 is used to perform the required IPSec processing including authentication and encryption.

The steps above are executed by the various modules in the system. Step 1 is executed by the flow engine module that receives the outgoing internal DTU from the local intranet. The searching in step 2 is, again, executed by the flow engine module. However, when no matching SAs or SA groups are found, the flow engine module forwards the outgoing internal DTU to the policy engine module by way of the switch module. The policy engine module then creates the appropriate SA group and returns the outgoing internal DTU to the relevant flow engine module, again by the way of the switch module. For step 3, the flow engine module, creates a header containing the relevant SA information associated with the outgoing internal DTU. This header and the outgoing internal DTU are then forwarded to the crypto engine module for encryption and authentication. The crypto engine module encrypts the outgoing internal DTU pursuant to the SA information in the header. The encrypted internal DTU is then transformed into an outgoing external DTU with an appropriate ESP header and trailer and new IP header. The outgoing external DTU is forwarded using the switch module, to the relevant flow engine module. This flow engine module then sends out the external DTU to the second remote intranet.

As noted above, the generic process executed by the system 60 is that illustrated in FIG. 5. Referring to FIG. 5, the process begins at step 110 with a DTU being received by a flow engine. The DTU is then checked against entries in the flow table (Step 120) to determine if the DTU is expected. This involves determining if the characteristics of the DTU correspond with at least one entry in the flow table. If there is a match, then the DTU is forwarded to the next processing destination by way of the switch module (step 130). This next processing destination can be another flow engine module, or another internal module such as an encryption module. Connector A 140 then moves the logic flow back to step 110 to receive another DTU.

If the decision in step 120 is negative in that the received DTU does not match a flow table entry, step 150 checks the received DTU against entries in the listening table in much the same manner as in step 120. If the decision in step 150 (determining if the characteristics of the received DTU match an entry in the listening table) is positive, then step 160 is executed This step involves sending the received DTU to the policy engine module for further checking if required. It is quite likely that a connection will be established. The establishment of a connection includes the creation of flow table entry to manage subsequently received DTUs on the connection. Connector A 140 then moves the logic flow back to step 110.

If the received DTUs do not have characteristics which match those of a listening table entry, step 180 is that of forwarding the DTU to the policy engine module for further checking and processing against configured security policies. This checking will determine if the DTU is acceptable or not based on the configured security policies. Decision 190 determines if the DTU is to be allowed access or not based on the checking done in step 180.

If the decision in step 190 is positive (i.e. the DTU is to be allowed access), a flow table entry corresponding to the characteristics of the received DTU (step 200) is inserted into the flow table. Thus, any succeeding DTUs with the same characteristic will be allowed access based on the new flow table entry. The logic flow then moves to connector A 140 which returns the flow to step 110.

If the decision in step 190 is negative and the received DTU is unacceptable based on the configured security policies in the policy engine module, then a log entry is generated (step 210) and the offending DTU is discarded (step 220). The logic flow then continues to connector A 140 to return to step 110.

While FIG. 5 simplifies the steps executed by the system 60, it should be noted that numerous well-known steps are subsumed in some of the step outlined above. As an example, step 160, while only noting the forwarding of the received DTU to the policy engine, involves other steps such as security checks performed on the received DTU according to the security policies enforced by the policy engine. Also, step 130, that of forwarding the received DTU to its eventual destination, may involve a network address translation performed by the flow engine and, if configured to do so, error checking functions performed on the received DTU.

To implement the system 60, an IC (integrated circuit) can be used to implement most of the functions of the system 60. In one implementation (see FIG. 6) half of the policy engine module (the content transfer engine for transferring data) is on a single IC with half of the flow engine (the DTU transfer engine portion) and the switch module. For this implementation, the content control processor for the policy engine and the DTU control processor of the flow engine and the cryptographic engine, are in separate Integrated Circuits or processors.

Figure 6:
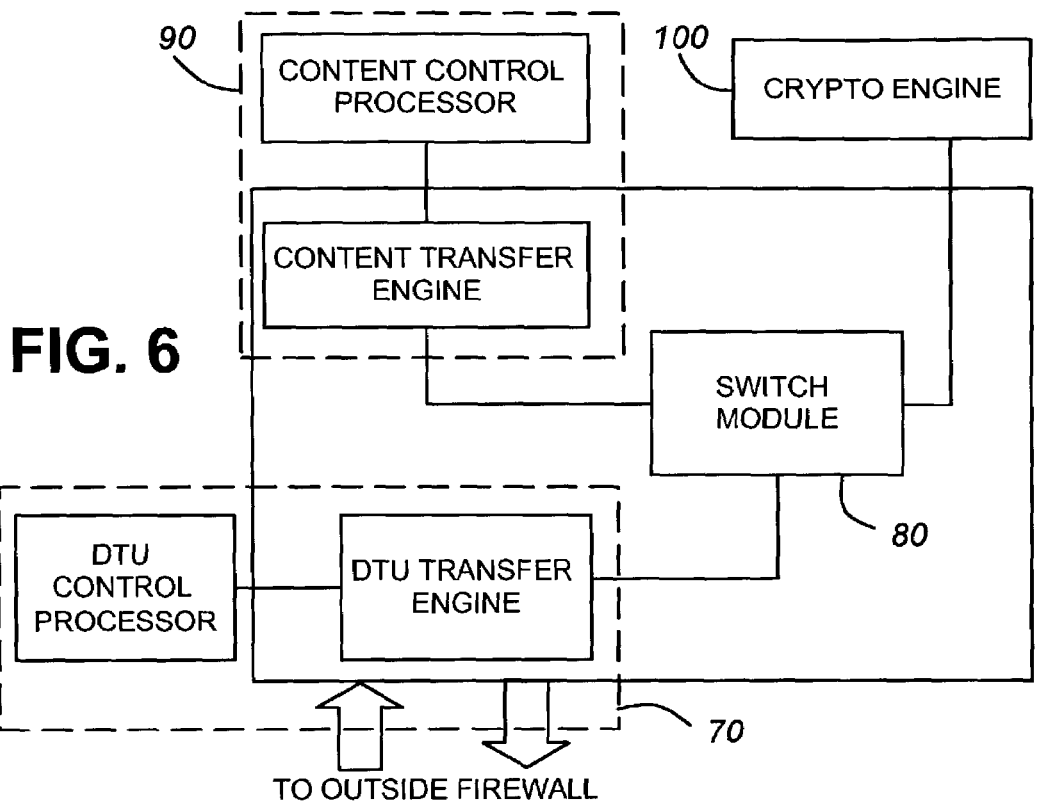
FIG. 6 is a block diagram of an IC architecture for implementing the system of FIG. 3.
Figure 7:
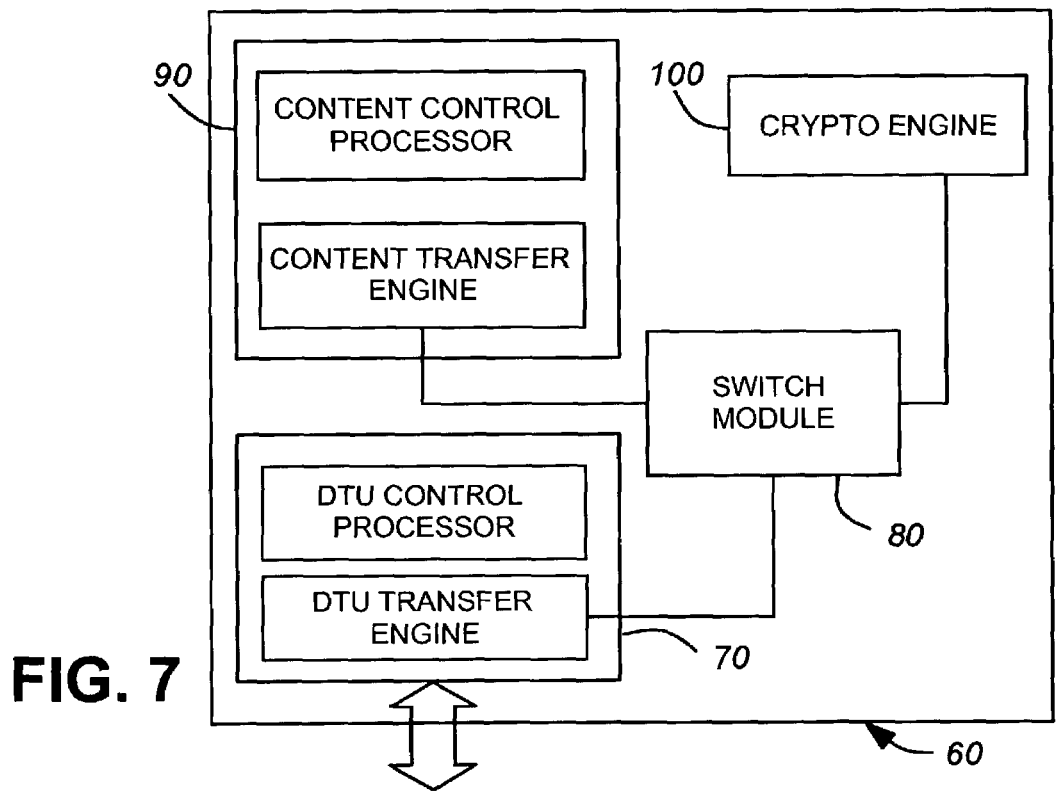
FIG. 7 is a block diagram of an alternative IC architecture for implementing the system of FIG. 3.

An alternative to the architecture in FIG. 6 is that illustrated in FIG. 7. For this implementation, a monolithic IC is used which contains all components of the policy engine module 90, switch module 80, cryptographic engine 100, and flow engine module 70.

While the above description and the accompanying diagrams illustrate and refer to only one policy engine, multiple policy engines can be implemented to increase the speed and throughput of the system. Similarly, if the main function of the system is as a VPN gateway that requires copious amounts of encryption and decryption capabilities, multiple parallel cryptographic engines can be implemented. Conversely, a dedicated external module can be used for all encryption/decryption functions.

As noted above, the switch module has a number of requirements. In addition to these, the switch module is ideally capable of rapid movement of data streams in this system without any CPU involvement. Furthermore, the switch module, to handle the application proxy functions of the system along with its other functions as a TCP circuit gateway and as a TCP offload, ideally can handle continuous byte streams. Delineated packets would ideally also be something that the switch module can handle as they are used in forwarding packet flows from ingress flow engine modules to egress flow engine modules and in forwarding DTUs with pre-pended headers to the cryptographic engine module for processing.

The flow engine modules may be implemented as specialized hardware to speed up repetitive functions and as a general CPU to assist in orchestrating the hardware functions. The policy engine module is best implemented as a general purpose CPU with hardware assist for tasks such as pattern matching for content filtering, virus scanning and for scanning for keywords as an application layer proxy. The policy engine module may also use the TCP protocol offload capability of the flow engine modules for application layer proxy applications and for communicating with outside servers for authentication/authorization content filtering, and virus scanning. External chips may also be used to assist in the computations required for the key exchange process outlined above.

A person understanding this invention may now conceive of alternative structures and embodiments or variations of the above all of which are intended to fall within the scope of the invention as defined in the claims that follow.

What is claimed is:

1. A method of verifying data transmission units (DTUs) being received by a device, the method comprising the steps of:
   a) receiving an incoming DTU;
   b) determining if said incoming DTU has characteristics which match an entry in at least one flow table containing characteristics of DTUs associated with established network connections;
   c) in the event said characteristics of said incoming DTU match said entry in said at least one flow table, forwarding said incoming DTU to a flow engine module of the device for forwarding to a destination of said incoming DTU without passing through a policy engine module of said device and without any further security policy processing;
   d) in the event said characteristics of said incoming DTU does not match an entry in said at least one flow table, determining if said incoming DTU has characteristics which match an entry in at least one listening table containing characteristics of DTUs associated with network connections to be established;
   e) in the event said characteristics of said incoming DTU match an entry in said at least one listening table, forwarding said incoming DTU to a policy engine module to establish a network connection;
   f) in the event said characteristics of said incoming DTU does not match an entry in said at least one listening table, forwarding said incoming DTU to a policy engine module for checking against predetermined security policies;
   g) in the event said incoming DTU passes said checking by said policy engine module against predetermined security policies, at least one flow table or at least one listening table is updated to list characteristics of DTUs associated with a network connection for said incoming DTU,
   wherein said method is executed by a system comprising:
       the policy engine module for enforcing security policies for said network and for inserting and deleting entries in at least one flow table and in at least one listening table;
       at least one flow engine module for receiving data transmission units (DTUs) from sources external to said system and for forwarding said DTUs to destinations external to said system; and
       a switch module for routing DTUs between different modules in said system wherein
           said switch module is coupled to each one of the other modules in the system;
           said flow engine module receives and forwards DTUs if said DTUs match an entry in either said flow table or said listening table.

2. A method according to claim 1 wherein said policy engine module provides a checking function on said incoming DTU, said checking function being at least one of content filtering, virus scanning, validation of new data flows, authentication of DTUs, authorization of DTUs, or Internet Key Exchange.

3. A method according to claim 1 wherein in step c), said incoming DTU passes through a cryptographic engine module for encrypting at least a portion of said incoming DTU.

4. A method according to claim 1 wherein in step c), said incoming DTU passes through a cryptographic engine module for decrypting at least a portion of said incoming DTU.

5. A method according to claim 1 wherein said incoming DTU contains an encrypted key for establishing a virtual private networking connection.

6. A method according to claim 1 wherein at least one of said characteristics is selected from a group consisting of:
   a network interface;
   a destination address;
   a destination port;
   a source address;
   a source port;
   a protocol identifier; and
   a Security Parameter Index.

7. A method according to claim 1 wherein at least one of said established network connections is an existing virtual private networking (VPN) connection.

8. A method according to claim 4 further including forwarding a decrypted DTU to a destination external to the device, said destination being part of a virtual private network.

9. A method according to claim 1 wherein at least one of said established network connections is a TCP (transmission control protocol) connection.

10. A method according to claim 1 wherein said network connection to be established is a TCP connection.

11. A method according to claim 1 wherein at least one of said established connections is a UDP (User Datagram Protocol) connection.

12. A method according to claim 1 wherein said network connection to be established is a UDP connection.

13. A method according to claim 1 wherein said system further includes a cryptographic engine module for encrypting and decrypting DTUs.

14. A system for providing firewall and virtual private networking functions to a network, the system comprising:
   a processor;
   at least one flow table having entries which contain characteristics of DTUs associated with established network connections;
   at least one listening table having entries which contain characteristics of DTUs associated with network connections to be established;
   a policy engine module for enforcing security policies for said network and for inserting entries in said at least one flow table and in said at least one listening table;
   at least one flow engine module for receiving data transmission units (DTUs) from sources external to said system and for forwarding said DTUs to destinations external to said system;
   a switch module for routing DTUs between different modules in said system wherein
       said switch module is coupled to each one of the other modules in the system;
       said flow engine module receives and forwards DTUs to destinations external to said system if said DTUs match an entry in said flow table, said DTUs being forwarded not passing through said policy engine module and without any further security policy processing,
   wherein said system with use of said processor executes a process for verifying DTUs being received by the system, the process comprising the steps of:

a) receiving an incoming DTU at the flow engine module;
b) determining if said incoming DTU has characteristics which match at least one set of criteria;
c) in the event said characteristics of said incoming DTU match said at least one set of criteria, forwarding said incoming DTU to a separate component of the device for further processing;
d) in the event said characteristics of said incoming DTU does not match said at least one set of criteria, forwarding said incoming DTU to a policy engine module for further checking,
e) in the event said incoming DTU passes said checking by said policy engine module against predetermined security policies, at least one flow table or at least one listening table is updated to list characteristics of DTUs associated with a network connection for said incoming DTU.

15. A system according to claim 14 wherein said separate component is the policy engine module for checking said incoming DTUs against at least one network access security policy.

16. A system according to claim 14 wherein said separate component is one of said at least one flow engine module for forwarding said incoming DTU to a location external to said device.

17. A system according to claim 14 wherein said separate component is a cryptographic engine module for encrypting at least a portion of said incoming DTU.

18. A system according to claim 14 wherein said separate component is a cryptographic engine module for decrypting at least a portion of said incoming DTU.

19. A system according to claim 14 wherein said system further comprises a cryptographic engine module for encrypting and decrypting DTUs.

20. A system according to claim 14 wherein at least one of said characteristics is selected from a group consisting of:
    a network interface;
    a destination address;
    a destination port;
    a source address;
    a source port;
    a protocol identifier; and
    a Security Parameter Index.

21. A system according to claim 14 wherein said system is implemented on at least one integrated circuit (IC).

22. A system according to claim 14 wherein said system is implemented on a single IC.

23. A system according to claim 14 wherein said policy engine module provides a checking function on said incoming DTU, said checking function being at least one of content filtering, virus scanning, validation of new data flows, authentication of DTUs, authorization of DTUs, or Internet Key Exchange.

24. A device for interconnecting at least two networks, the device comprising:
    a processor;
    at least one policy engine module for enforcing security policies of a first network against data traffic coming from and going to at least one second network, said at least one policy engine module inserts and deletes entries in at least one flow table and at least one listening table and provides checking functions for incoming data transmission units (DTUs), said checking function being at least one of content filtering, virus scanning, validation of new data flows, authentication of DTUs, authorization of DTUs, or Internet Key Exchange;
    at least one flow engine module for receiving and transmitting said data traffic between said first network and said at least one second network; and
    a switch module for forwarding relevant data traffic between modules internal to said device;
wherein said switch module is coupled to each one of the other modules in the device and the or each of said flow engine modules receives and forwards said data traffic if said data traffic matches entries in said at least one flow table or in said at least one listening table,
    and wherein each flow table has entries with characteristics of DTUs associated with established network connections and each listening table has entries with characteristics wherein DTUs which match an entry in a flow table is forwarded to their destination without passing through a policy engine module, and without any further security policy processing,
    wherein said device with use of said processor executes a process for verifying DTUs being received by the device, the process comprising the steps of:
    a) receiving an incoming DTU at the at least one flow engine module;
    b) determining if said incoming DTU has characteristics which match at least one set of criteria;
    c) in the event said characteristics of said incoming DTU match said at least one set of criteria, forwarding said incoming DTU to a separate component of the device for further processing;
    d) in the event said characteristics of said incoming DTU does not match said at least one set of criteria, forwarding said incoming DTU to the at least one policy engine module for further checking;
    e) in the event said incoming DTU passes said checking by said at least one policy engine module against predetermined security policies, at least one flow table or at least one listening table is updated to list characteristics of DTUs associated with a network connection for said incoming DTU.

25. A device according to claim 24 further comprising a cryptographic engine module for encrypting and decrypting at least a portion of said data traffic.

* * * * *

UNITED STATES PATENT AND TRADEMARK OFFICE
CERTIFICATE OF CORRECTION

| | | |
|---|---|---|
| PATENT NO. | : 7,441,262 B2 | |
| APPLICATION NO. | : 10/192802 | |
| DATED | : October 21, 2008 | |
| INVENTOR(S) | : Hui et al. | |

It is certified that error appears in the above-identified patent and that said Letters Patent is hereby corrected as shown below:

Title page, item (56), under "U.S. Patent Documents", in Column 1, Line 5, delete "726/22" and insert -- 726/8 --.

Column 24, lines 24-25, in Claim 24, after "characteristics" insert -- of DTUs associated with network connections to be established, --.

Signed and Sealed this
Twenty-third Day of August, 2011

David J. Kappos
*Director of the United States Patent and Trademark Office*